(12) United States Patent
Wong et al.

(10) Patent No.: US 11,394,905 B2
(45) Date of Patent: Jul. 19, 2022

(54) DYNAMIC REGION OF INTEREST AND FRAME RATE FOR EVENT BASED SENSOR AND IMAGING CAMERA

(71) Applicant: Sony Semiconductor Solutions Corporation, Kanagawa (JP)

(72) Inventors: Ping Wah Wong, San Jose, CA (US); Sa Xiao, San Jose, CA (US); Kevin Chan, San Jose, CA (US)

(73) Assignee: Sony Semiconductor Solutions Corporation, Kanagawa (JP)

( * ) Notice: Subject to any disclaimer, the term of this patent is extended or adjusted under 35 U.S.C. 154(b) by 18 days.

(21) Appl. No.: 16/859,882

(22) Filed: Apr. 27, 2020

(65) Prior Publication Data

US 2021/0185264 A1    Jun. 17, 2021

Related U.S. Application Data

(60) Provisional application No. 62/947,697, filed on Dec. 13, 2019.

(51) Int. Cl.
  *H04N 5/345* (2011.01)
  *H04N 5/353* (2011.01)
  (Continued)

(52) U.S. Cl.
  CPC ....... *H04N 5/3454* (2013.01); *H04N 5/23218* (2018.08); *H04N 5/23219* (2013.01); *H04N 5/23232* (2013.01); *H04N 5/343* (2013.01); *H04N 5/353* (2013.01); *H04N 5/378* (2013.01); *H04N 5/3745* (2013.01)

(58) Field of Classification Search
  CPC ...... H04N 5/3745; H04N 5/353; H04N 5/378; H04N 5/144; H04N 5/23251; H04N 5/23254; H04N 5/23258; H04N 5/351
  See application file for complete search history.

(56) References Cited

U.S. PATENT DOCUMENTS 10,097,804 B2   10/2018  Sato et al.
2006/0140445 A1*  6/2006  Cusack .............. G06K 9/00261
                                                    382/103
(Continued)

OTHER PUBLICATIONS

U.S. Appl. No. 16/859,905, filed Apr. 27, 2020, Chan et al.
U.S. Appl. No. 16/859,928, filed Apr. 27, 2020, Wong et al.
U.S. Appl. No. 16/859,943, filed Apr. 27, 2020, Chan et al.

*Primary Examiner* — Nicholas G Giles
(74) *Attorney, Agent, or Firm* — Sheridan Ross P.C.

(57) ABSTRACT

An imaging device with a plurality of image sensing pixels and a plurality of event detection pixels is provided. The image sensing and event detection pixels can be provided as part of different arrays of pixels, or can be included within a common array of pixels. The event detection pixels are operated continuously to provide signals indicating the occurrence of events. In response to detecting an event, image sensing pixels are selectively operated. The selective operation of the image sensing pixels can include activation of image sensing pixels within one or more regions of interest, while image sensing pixels not included in any region of interest remain off. The selective operation of the image sensing pixels can include the selection of a frame rate applied across an array of mage sensing pixels, or within determined regions of interest.

16 Claims, 21 Drawing Sheets

(51) Int. Cl.
*H04N 5/3745* (2011.01)
*H04N 5/378* (2011.01)
*H04N 5/232* (2006.01)
*H04N 5/343* (2011.01)

(56) References Cited

U.S. PATENT DOCUMENTS

2009/0066782 A1   3/2009  Choi et al.
2010/0231738 A1   9/2010  Border et al.
2014/0009648 A1   1/2014  Kim et al.
2015/0229889 A1   8/2015  Boettiger
2015/0317304 A1  11/2015  An et al.
2018/0137647 A1   5/2018  Li et al.
2018/0167575 A1*  6/2018  Watanabe ............... H04N 5/378
2018/0342081 A1  11/2018  Kim et al.
2019/0007678 A1   1/2019  Perez-Ramirez et al.
2019/0007690 A1   1/2019  Varadarajan et al.

* cited by examiner

DYNAMIC REGION OF INTEREST AND FRAME RATE FOR EVENT BASED SENSOR AND IMAGING CAMERA

CROSS REFERENCE TO RELATED APPLICATIONS

This application claims the benefit of U.S. Provisional Patent Application Ser. No. 62/947,697, filed Dec. 13, 2019, the disclosure of which is incorporated herein by reference in its entirety.

TECHNICAL FIELD

The present disclosure relates to an imaging device with both dynamic vison sensor and imaging capabilities.

BACKGROUND

In the related art, a synchronization-type solid-state imaging device that captures image data in synchronization with a synchronization signal such as a vertical synchronization signal has been used in an imaging device and the like. In the typical synchronization-type solid-state imaging device, it is necessary to operate at a high frame rate in order to acquire accurately objects that move at a high speed. However, the time required to readout all imaging elements from the imaging device will place a limit on the highest frame rate that the imaging device can operate at. This in turn places a limit on the ability of the imaging device to capture fast moving objects. Thus it is difficult to cope with cases in which relatively high-speed processing is demanded, such as in fields demanding high speed (e.g. real time) processing, such as autonomous vehicles, robotics, and the like. In this regard, there is suggested a non-synchronization-type solid-state imaging device in which a detection circuit is provided for every pixel to detect a situation in which a change of light-reception amount exceeds a threshold value as an address event in real time. The non-synchronization-type solid-state imaging device that detects the address event for every pixel is also referred to as an event based sensor (EBS).

A camera that combines EBS and regular frame based imaging can be provided. In such a system, the detection of an event using the EBS capabilities of the camera can be used as a trigger to initiate the operation of the imaging functions of the camera. However, such systems have resulted in inefficient and insufficient data transmission and object tracking by the camera.

SUMMARY

Technical Problem

A camera with a combination of EBS and regular frame based imaging in which the operation of the imaging functions is triggered in response to the detection of an event can overcome some of the limitations of using a regular imaging type device alone to reliably detect events while providing efficient operation. However, such systems continue to suffer from various deficiencies, particularly in certain operating scenarios. For example, activating the entire area of an imaging sensor in response to the detection of an event by an EBS sensor can cause an inefficiency in data transmission where the area of the event corresponds to a sub-area or region of the image frame. In addition, activation of the entire area of the imaging sensor can result in an inefficiency in power consumption. As another example, simply activating an imaging sensor at a standard frame rate in response to the detection of an object can result in poor imaging of a fast moving object where the standard frame rate is too low to capture the object clearly. Conversely, where the standard frame rate of the imaging sensor is higher than otherwise required to clearly image a detected object, the power consumption of the image sensor will be unnecessarily high.

Therefore, the present disclosure provides cameras, sensor systems, devices, and methods that are capable of providing both imaging and event detection functions with improved image sensor efficiency and effectiveness as compared to other configurations.

Solution to Problem

In accordance with embodiments and aspects of the present disclosure, there is provided a camera or a sensor system having EBS and image sensor (e.g. red, green, blue image sensor) capabilities or functions. The EBS and image sensor capabilities may be provided by separate EBS and imaging sensor devices. The EBS and image sensing capabilities may also be implemented by a sensor device having combined EBS and imaging sensor capabilities. A sensor device having combined EBS and imaging sensor capabilities can include a sensor device with an array of pixels that includes both EBS and image sensing pixels. Moreover, a combined EBS and image sensor can include photoelectric conversion regions that are provided as part of pixels that perform both EBS and image sensing functions. For ease of description, the discussion herein will refer to EBS and image sensor functions as being provided by separate EBS and image sensors, however, unless specifically stated otherwise, it should be understood that the EBS and image sensors can be integrated into a single sensor device that provides the EBS and image sensor functions.

In operation, an event detected by the EBS sensor results in activation of the image sensor. Moreover, in accordance with embodiments of the present disclosure, the activation of the image sensor includes activation of a selected set of pixels included in the image sensor or imaging sensor portion of a combined EBS and image sensor, rather than the entire area of the imaging sensor. The selected set of pixels can encompass the area of the scene monitored by the EBS sensor in which the event or change in light intensity was detected. In accordance with at least some embodiments of the present disclosure, the area of the image sensor that is activated in response to the detection of a given event can be a predetermined size and can encompass less than all of the pixels within the image sensor. Multiple areas can be activated simultaneously or sequentially during the acquisition of a frame of image data.

In accordance with at least some embodiments and aspects of the present disclosure, the area of the image sensor that is activated in response to the detection of an event by the EBS sensor can vary. For example, an event corresponding to an object that is determined to be moving relative to the EBS sensor can result in the activation of a larger area of the image sensor than is activated where an event is associated with a slow moving object. In accordance with further embodiments and aspects of the present disclosure, an object causing the detection of an event that is travelling relatively quickly will result in the activation of a larger area of the image sensor than an object that is moving relatively slowly. The shape of the activated area can also be varied based on characteristics of the object detected by the EBS sensor. For example, an activated area can be elongated along a direction that an object is determined or predicted to be travelling.

In accordance with still further embodiments and aspects of the present disclosure, a frame rate of the image sensor can be varied based on characteristics of an object detected by the EBS sensor. These characteristics can include a determined rate of change of the object. For instance, the image sensor can be operated at a relatively low frame rate where a detected object is moving slowly. The image sensor can be operated at a relatively high frame rate where a detected object is moving quickly.

In accordance with at least some embodiments of the present disclosure, the characteristics of an object detected by the EBS sensor can be analyzed in connection with determining the operating parameters of the image sensor. For instance, a neural network or other decision making facility can determine whether a detected event has been triggered by an object within a desired object category. If a desired object category has been detected, the region of interest occupied by or surrounding the desired object can be mapped to the image sensor, and that area of the image sensor can be activated. Further actions can then be taken. For instance, data from the activated area of the image sensor, corresponding to the region of interest, can be analyzed, for example by a neural network or other decision making facility, to perform object recognition, object classification, gesture recognition, or the like.

In general, it is desirable to discontinue operation of the image sensor and return to EBS sensor operation only in order to conserve power. Embodiments and aspects of the present disclosure can discontinue operation of the image sensor, and return the system to an EBS mode when certain conditions are satisfied. These can include after a determination is made that nothing of interest is occurring. For instance, imaging of an object can be discontinued; and the image sensor can be returned to sleep mode after an object that was previously moving has stopped. Image sensor operation can also be discontinued after an object has been identified, and it is determined that continued imaging of the identified object is not required or desired. As another example, image sensor operation can be discontinued after an object has moved out of the imaged scene. As still another example, image sensor operation can be discontinued after a predetermined period of time has elapsed. In accordance with embodiments of the present disclosure, EBS sensor operation can remain active continuously, whether or not image sensor operation is active.

The present disclosure can provide cameras, systems, or devices with event based sensing and imaging capabilities that are capable of improved power consumption, data transmission, and data processing efficiencies.

DESCRIPTION OF EMBODIMENTS

Figure 1:
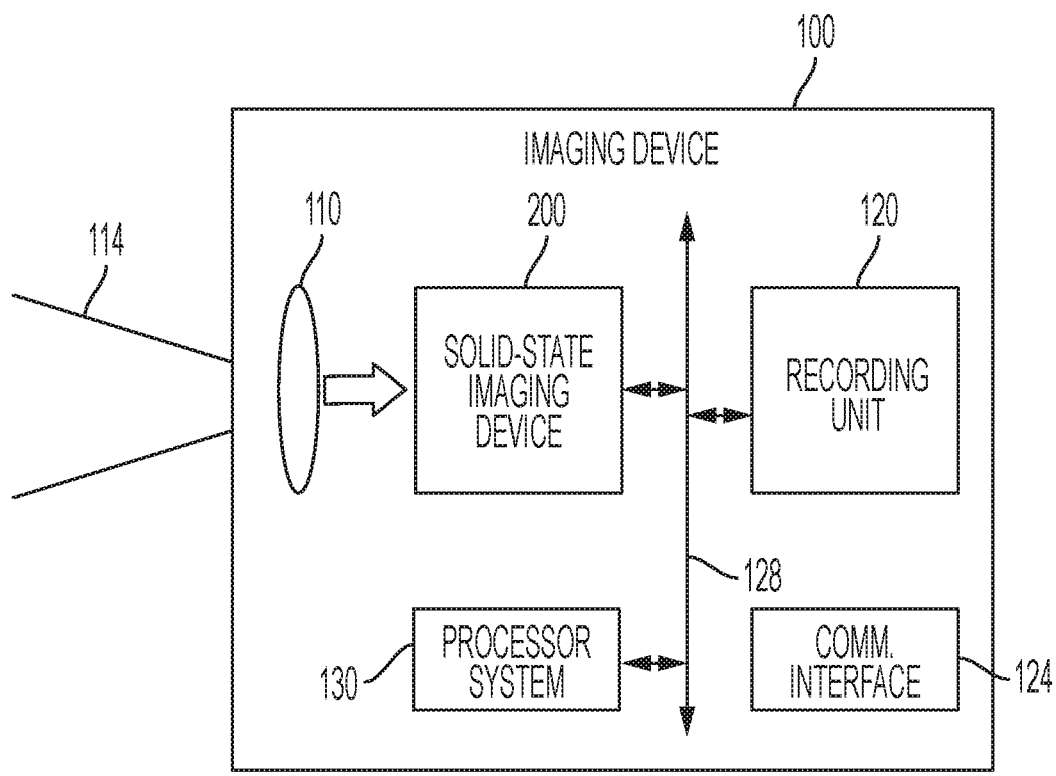
FIG. 1 is a block diagram illustrating a schematic configuration example of an image sensor in accordance with embodiments of the present disclosure.

Hereinafter, embodiments of the present disclosure will be described in detail on the basis of the accompanying drawings. Furthermore, in the following embodiments, the same reference numeral will be given to the same or equivalent portion or element, and redundant description thereof will be omitted.

A typical event based sensor (EBS) employs a so-called event-driven type driving method in which the existence of address event ignition is detected for any unit pixel, and a pixel signal is read out from a unit pixel in which the address event ignition and ignition time information is detected. An EBS or event detection sensor responds to a change in intensity asynchronously. Intensity change is correlated with a change in photocurrent, and if this change exceeds a constant threshold value it could be detected as an event.

An image sensor operates to capture a view or image of a scene. Pixels within an array of pixels provide information regarding the intensity of the light received from an area of a scene from an imaging lens or lens assembly, which together with the array of pixels defines a field of view of the sensor. In a typical implementation, pixels within the array are sensitive to light of different wavelengths, which allows color information to be captured. For example, the pixels can be arranged in groups of four, with one of the pixels sensitive to red light, two of the pixels sensitive to green light, and one pixel sensitive to blue light. Accordingly, such sensors are commonly known as RGB sensors. Other color sensitivity arrangements, such as cyan, magenta, and yellow (CMY), can also be used. The different wavelength sensitivities can be achieved in various ways, such as by using color filters or by configuring pixels as stacked image sensor pixels.

As used herein, a unit pixel represents a minimum unit of a pixel or unit pixel including one photoelectric conversion element (also referred to as "light-receiving element"), and can correspond to each dot in image data that is read out from an image sensor as an example. In addition, the address event represents an event that occurs for every address that is allocable to each of a plurality of the unit pixels which are arranged in a two-dimensional lattice shape.

FIG. 1 is a block diagram illustrating a schematic configuration example of an imaging device according to at least some embodiments of the present disclosure. As illustrated in FIG. 1, for example, an imaging device 100 includes an imaging lens 110, a solid-state imaging device or image sensor 200, a recording unit 120, a communication interface 124, and a processor system or control system 130. The various components of the imaging device 100 may be interconnected to one another by a communications bus 128 or signal lines. As examples, the imaging device 100 can be provided as or as part of a camera that is mounted in an industrial robot, an in-vehicle camera, or as part of or in connection with other devices or instruments.

The imaging lens 110 can include an optical system that collects light from within a field of view 114. The collected or incident light is directed (e.g. condensed) onto a light-receiving surface of the image sensor 200. In particular, the imaging lens 110 can collect light from within a selected area of a scene by directing the field of view 114 to encompass that portion of the scene. The light-receiving surface is a surface of a substrate on which photoelectric conversion elements of pixels 310 included in the image sensor 200 are arranged. The image sensor 200 photoelectrically converts the incident light to generate image data. As discussed herein, the image sensor 200 can include different sets of photoelectric conversion elements disposed on the same or different substrates. Moreover, the image sensor 200 can include photoelectric conversion elements that perform single or multiple functions. These functions can include event detection and imaging functions. In addition, the image sensor 200 can execute predetermined signal processing such as noise removal and white balance adjustment with respect to the generated image data. A result obtained by the signal processing and a detection signal indicating the existence or nonexistence of an address event ignition and ignition time information can be output by the image sensor 200 to the processor system 130. A method of generating the detection signal indicating the existence or nonexistence of the address event ignition will be described later.

The recording system 120 is, for example, constituted by a flash memory, a dynamic random access memory (DRAM), a static random access memory (SRAM), or the like, and records data provided from the image sensor 200.

The processor system 130 is, for example, constituted by a central processing unit (CPU) and the like. For example, the processor system 130 can include one or more general purpose processors, controllers, field programmable gate arrays (FPGAs), graphical processing units (GPUs), application specific integrated circuits (ASIC), or combinations thereof. Moreover, the processor system 130 can execute application programming or routines, stored as software or firmware in memory or data storage included in or interconnected to the processor system 130 to perform various functions and methods as described herein. For example, the processor system 130 can process data output from the image sensor 200. For example, as described herein, the processor system 130 can process event detection signals output by the EBS sensor function or portion of the image sensor 200, and can control the imaging sensor function or portion of the solid-state imaging device, at least in part in response to the event detection signals. The processor system 130 can also control components of the imaging device 100 in addition to the image sensor 200, such as the operation of the recording unit 120, the communication interface 124, focusing and shutter operations that might be supported by the imaging lens 110, and the like. In accordance with further embodiments of the present disclosure, the processor system 130 can implement advanced processing capabilities, including but not limited to neural network and artificial intelligence capabilities and functions, as described herein.

Next, a configuration example of the image sensor 200 will be described in detail with reference to the accompanying drawings.

Figure 2:
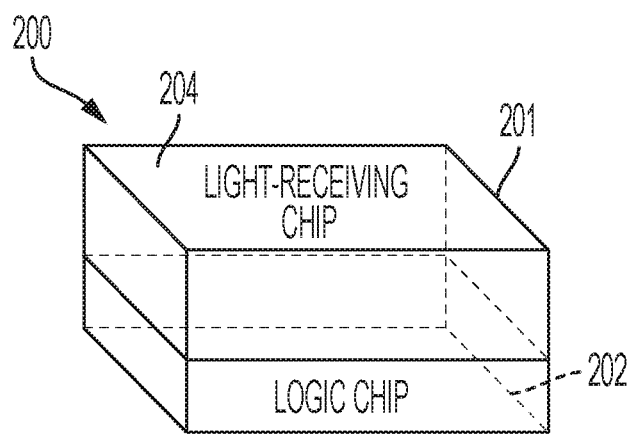
FIG. 2 is a view illustrating a lamination structure example of an image sensor in accordance with embodiments of the present disclosure.

FIG. 2 is a view illustrating a lamination structure example of an image sensor 200 in accordance with at least some embodiments of the present disclosure. As illustrated in FIG. 2, the image sensor 200 can have a structure in which a light-receiving chip 201 and a logic chip 202 are vertically laminated. A side of the light receiving chip 201 opposite the logic chip 202 is a light receiving surface 204. In joining of the light-receiving chip 201 and the logic chip 202, for example, so-called direct joining in which joining surfaces of the chips are planarized, and the chips are laminated with an inter-electron force can be used. However, there is no limitation thereto, and for example, so-called Cu—Cu joining in which copper (Cu) electrode pads formed on joining surfaces are bonded, bump joining, and the like can also be used.

In addition, the light-receiving chip 201 and the logic chip 202 are electrically connected to each other, for example, through a connection portion such as a through-silicon via (TSV) that penetrates through a semiconductor substrate. In the connection using the TSV, for example, a so-called twin TSV method in which two TSVs including a TSV that is formed in the light-receiving chip 201 and a TSV that is formed from the light-receiving chip 201 to the logic chip 202 are connected to each other on chip external surfaces, a so-called shared TSV method in which the light-receiving chip 201 and the logic chip 202 are connected with a TSV that penetrates through both the chips, and the like can be employed.

However, in the case of using the Cu—Cu joining or the bump joining in the joining of the light-receiving chip 201 and the logic chip 202, both the light-receiving chip 201 and the logic chip 202 are electrically connected to each other through a Cu—Cu joint or a bump joint.

As can be appreciated by one of skill in the art after consideration of the present disclosure, an imaging device 200 implemented as connected light receiving 201 and logic 202 chips can include image sensor 200 components disposed as part of the light receiving chip 201, with some or all of the processor system 130 components disposed as part of the logic chip 202. Other components, such as the recording unit 120 and communication interface components can be distributed amongst one or both of the chips 201 and 202. In accordance with still other embodiments, a data storage or other chip can be laminated and electrically connected to the light receiving 201 and logic 202 chips. Moreover, the light receiving chip can include multiple substrates joined to respective logic chips 202 or to a common logic chip 202, for example where the image sensor 200 includes multiple sensor devices.

Figure 3:
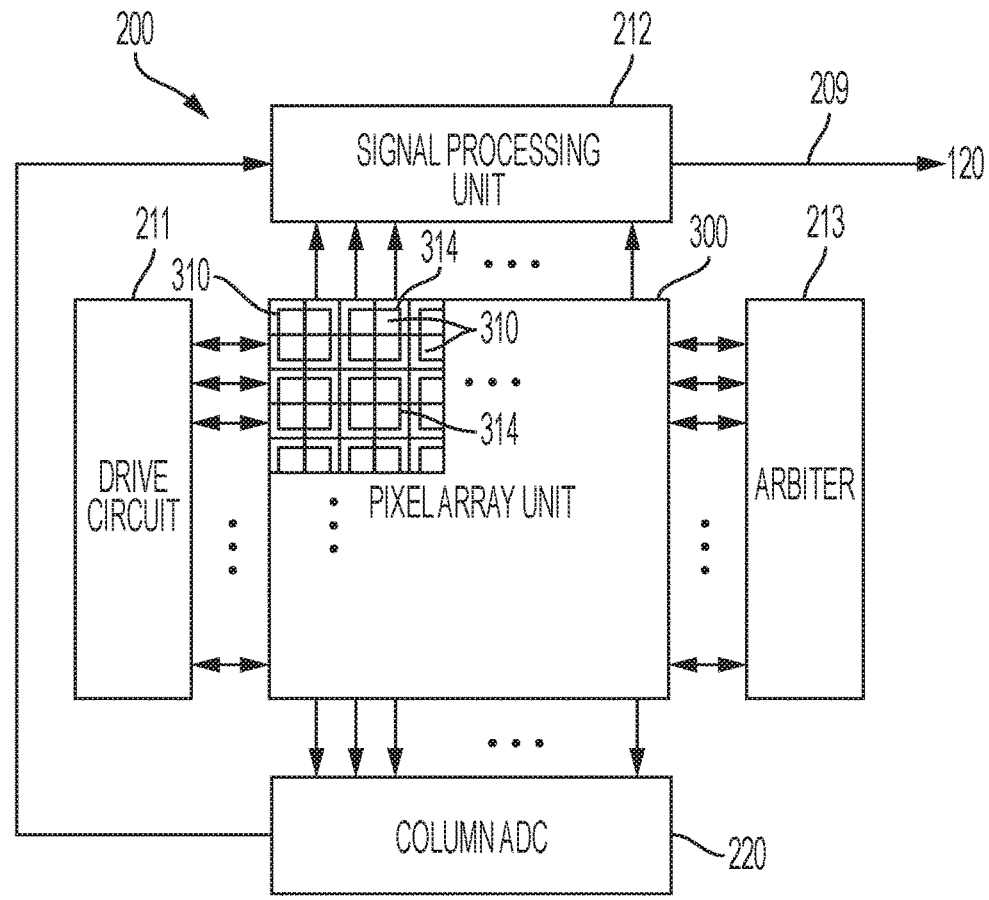
FIG. 3 is a block diagram illustrating a functional configuration example of an image sensor in accordance with embodiments of the present disclosure.

FIG. 3 is a block diagram illustrating a functional configuration example of the image sensor 200 according to at least some embodiments of the present disclosure. As illustrated in FIG. 3, the image sensor 200 can include a drive circuit 211, a signal processor 212, an arbiter 213, a column ADC 220, and a pixel array 300. Some or all of the components can be entirely or partially integrated into, or implemented by, the processor system 130.

A plurality of unit cells or pixels 310, also referred to herein simply as pixels 310, are arranged in the pixel array 300. Details of the unit pixels 310 will be described later. For example, each of the unit pixels 310 includes a photoelectric conversion element such as a photodiode, and a circuit that generates a pixel signal of a voltage value corresponding to the amount of charge generated in the photoelectric conversion element, hereinafter, referred to as a pixel circuit. Moreover, as discussed in greater detail elsewhere herein, the pixel circuit can include either or both of a first or imaging signal generation circuit and a second or address event detection readout circuit. Each photoelectric conversion element can be associated with a respective pixel circuit, or multiple photoelectric conversion elements can be associated with a common pixel circuit.

In this example, the plurality of unit pixels 310 are arranged in the pixel array 300 in a two-dimensional lattice shape. The plurality of unit pixels 310 may be grouped into a plurality of pixel blocks or groups, each including a predetermined number of unit pixels. Hereinafter, an assembly of unit pixels which are arranged in a horizontal direction is referred to as a "row", and an assembly of unit pixels which are arranged in a direction orthogonal to the row is referred to as a "column".

Each of the unit pixels 310 generates charges corresponding to an amount of light received at the respective photoelectric conversion element. In addition, at least some of the unit pixels 310 can be operated to detect the existence or nonexistence of address event ignition on the basis of whether or not a value of a current (hereinafter, referred to as a photocurrent) produced by charges generated in the photoelectric conversion element or a variation amount thereof exceeds a predetermined threshold value. When the address event is ignited, a signal is output to the arbiter 213.

The arbiter 213 arbitrates requests received from the unit pixels 310 performing the event detection function, and transmits a predetermined response to the unit pixel 310 which issues the request on the basis of the arbitration result. The unit pixel 310 which receives the response supplies a detection signal indicating the existence or nonexistence of the address event ignition (hereinafter, simply referred to as "address event detection signal") to the drive circuit 211 and the signal processor 212.

The drive circuit 211 drives each of the unit pixels 310, and allows each of the unit pixels 310 to output a pixel signal to the column ADC 220.

For every unit pixel 310 column, the column ADC 220 converts an analog pixel signal from the column into a digital signal. In addition, the column ADC 220 supplies a digital signal generated through the conversion to the signal processor 212.

The signal processor 212 executes predetermined signal processing such as correlated double sampling (CDS) processing (noise removal) and white balance adjustment with respect to the digital signal transmitted from the column ADC 220. In addition, the signal processor 212 supplies a signal processing result and an address event detection signal to the recording unit 120 through the signal line 209.

The unit pixels 310 within the pixel array unit 300 may be disposed in pixel groups 314. In the configuration illustrated in FIG. 3, for example, the pixel array unit 300 is constituted by pixel groups 314 that include an assembly of unit pixels 310 that receive wavelength components necessary to reconstruct color information from a scene. For example, in the case of reconstructing a color on the basis of three primary colors of RGB, in the pixel array unit 300, optical color filter materials can be deposited onto the pixels according to a predetermined color filter array to control light of desired wavelengths to reach a pixel surface. Specifically, a unit pixel 310 that receives light of a red (R) color, a unit pixel 310 that receives light of a green (G) color, and a unit pixel 310 that receives light of a blue (B) color are arranged in groups 314a according to the predetermined color filter array.

Examples of the color filter array configurations include various arrays or pixel groups such as a Bayer array of 2×2 pixels, a color filter array of 3×3 pixels which is employed in an X-Trans (registered trademark) CMOS sensor (hereinafter, also referred to as "X-Trans (registered trademark) type array"), a Quad Bayer array of 4×4 pixels (also referred to as "Quadra array"), and a color filter of 4×4 pixels in which a white RGB color filter is combined to the Bayer array (hereinafter, also referred to as "white RGB array"). In addition, and as discussed in greater detail elsewhere herein, event detection pixels can be interspersed or included within the pixel array 300. As also discussed in greater detail elsewhere herein, the event detection pixels may be provided as dedicated event detection pixels, which only perform an event detection function, or as combined event detection and image sensing pixels, which perform both event detection and image sensor functions.

Figure 4:
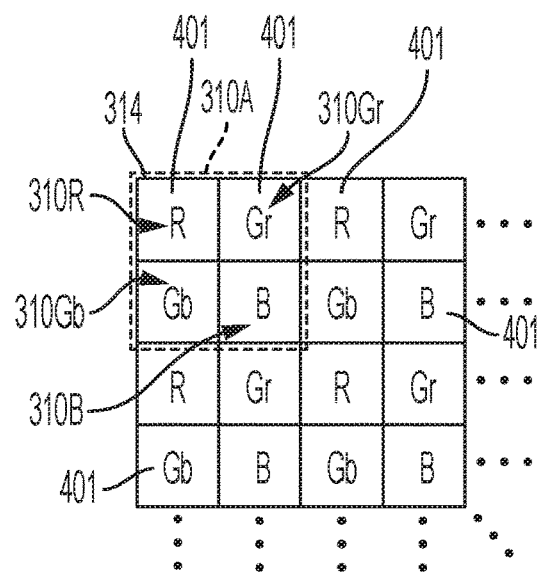
FIG. 4 illustrates an array example of unit pixels in accordance with embodiments of the present disclosure in a case of employing a Bayer array in a color filter array.

FIG. 4 is a schematic view illustrating an array example of unit pixels 310 in the case of employing pixel groups 314 with an arrangement of unit pixels 310 and associated color filters in the color filter array configured to form a plurality of Bayer arrays 310A. As illustrated in FIG. 4, in the case of employing the Bayer array as the color filter array configuration, in the pixel array 300, a basic pattern 310A including a total of four unit pixels 310 of 2×2 pixels is repetitively arranged in a column direction and a row direction. For example, the basic pattern 310A is constituted by a unit pixel 310R including a color filter 401 of a red (R) color, a unit pixel 310Gr including a color filter 401 of a green (Gr) color, a unit pixel 310Gb including a color filter 401 of a green (Gb) color, and a unit pixel 310B including a color filter 401 of a blue (B) color.

Figure 5A:
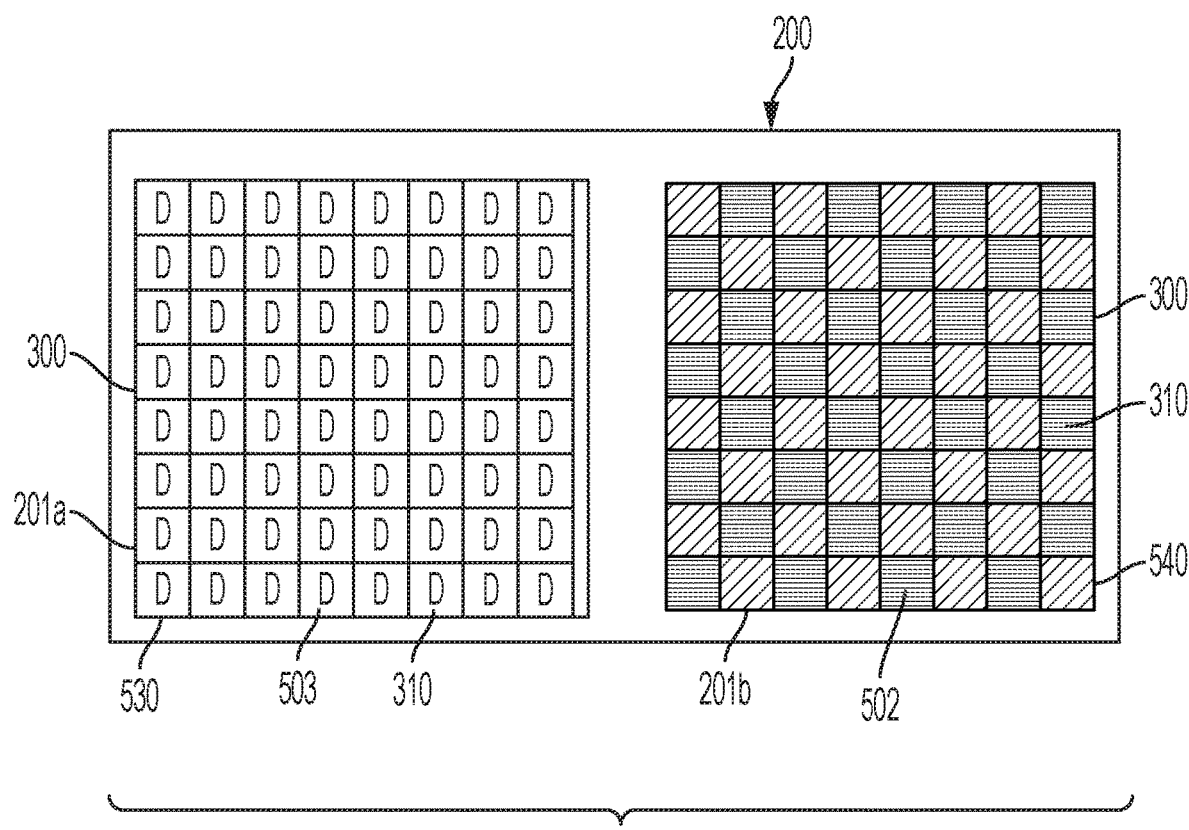
FIG. 5A illustrates aspects of an image sensor in accordance with embodiments of the present disclosure.

FIGS. 5A-5D depict various configuration examples of an imaging device 100, and in particular of arrangements of a solid-state imaging device or image sensor 200 pixels, in accordance with embodiments of the present disclosure. More particularly, FIG. 5A depicts an image sensor 200 having a first or EBS sensor 530, which includes an array 300 of pixels 310 in the form of address event detection pixels 503 disposed on a first light receiving chip or substrate 201a, and a second or imaging sensor 540, which includes an array 300 of pixels 310 in the form of image sensing pixels 502 disposed on a second light receiving chip or substrate 201b. As can be appreciated by one of skill in the art after consideration of the present disclosure, an imaging device 100 including separate EBS 530 and imaging 540 sensors can be configured with separate lens assemblies 110 that collect light from within the same or similar fields of view, or can be configured with a shared lens assembly 110 that directs light to the sensors 530 and 540 via a beam splitter. In accordance with embodiments of the present disclosure, the number of address event detection pixels 503 included in the EBS sensor 530 can be equal to the number of image sensing pixels 502 included in the imaging sensor 540. Moreover, the area of each address event detection pixel 503 can be the same as the area of each image sensing pixel 502. Alternatively, the EBS sensor 530 and the imaging sensor 540 can have different numbers of pixels 310. For example, the image sensor 200 can include an EBS sensor 530 having a relatively low number of event detection pixels 503, thereby providing a relatively low resolution, and an imaging sensor 540 having a relatively high number of image sensing pixels 502, thereby providing a relatively high resolution. In accordance with at least some embodiments of the present disclosure, event detection and image sensing operations can be performed simultaneously.

Figure 5B:
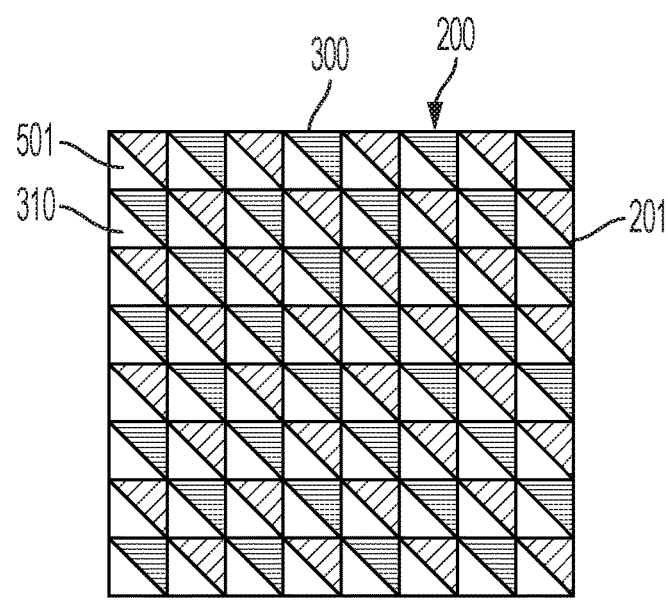
FIG. 5B illustrates aspects of an image sensor in accordance with other embodiments of the present disclosure.

FIG. 5B depicts image sensor 200 with pixels 310 configured as combined or shared event detection and image sensing pixels 501 disposed on a single light receiving chip or substrate 201. As can be appreciated by one of skill in the art after consideration of the present disclosure, the shared event detection and image sensing pixels 501 can be selectively operated in event detection or image sensing modes. Moreover, in accordance with at least some embodiments of the present disclosure, event detection and image sensing operations can be performed simultaneously with some pixels operating in event detection mode and some pixel operating in image sensing mode.

Figure 5C:
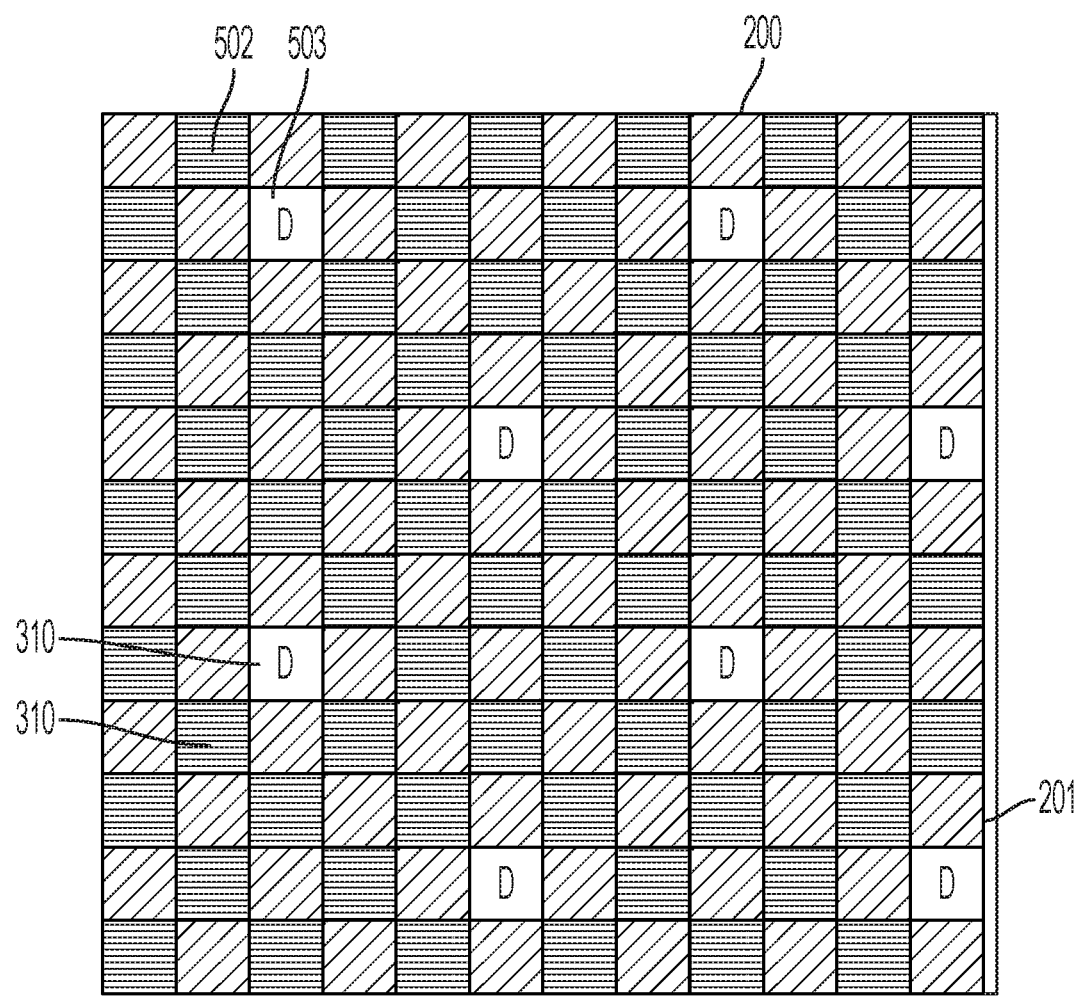
FIG. 5C illustrates aspects of an image sensor in accordance with other embodiments of the present disclosure.

FIG. 5C depicts image sensor 200 having an array of unit pixels 310 that includes a plurality of event detection pixels 503 and a plurality of image sensing pixels 502 formed on the same light receiving chip or substrate 201. In the illustrate example, the majority of the unit pixels are in the form of image sensing pixels 502, with a smaller number of event detection pixels 503 disposed amongst the image sensing pixels 502. However, an image sensor 200 having both event detection 503 and image sensing 502 pixels disposed on the same light receiving chip or substrate 201 can include the same number of pixels 502 and 503, or can have more event detection pixels 503 than image sensing pixels 502. In accordance with at least some embodiments of the present disclosure, event detection and image sensing operations can be performed simultaneously.

Figure 5D:
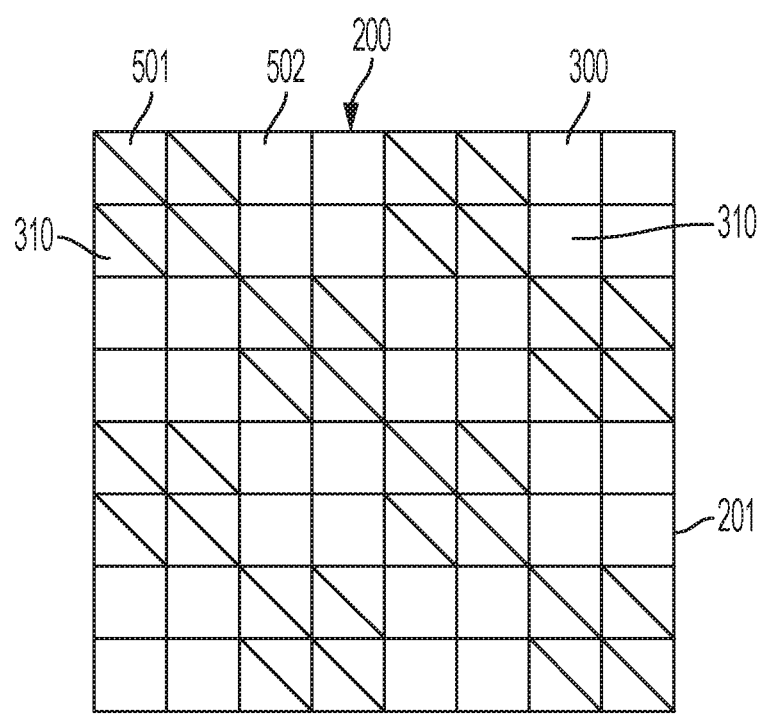
FIG. 5D illustrates aspects of an image sensor in accordance with other embodiments of the present disclosure.

FIG. 5D depicts an image sensor 200 having an array of unit pixels 310 that includes groups of shared event detection and image sensing pixels 501, and groups of image sensing pixels 502, formed on the same light receiving chip or substrate 201. The individual groups can be configured as Bayer arrays that alternate between Bayer array groups of shared event detection and image sensing pixels 501, and Bayer array groups of image sensing pixels 502. Accordingly, FIG. 5D is an example of an image sensor 200 in which different shared event detection and image sensing pixels 501 can respond to light within different wavelength ranges. For example, the shared event detection and image sensing pixels 501 can be associated with color filters. Alternatively, the shared pixels 501 can all receive light within the same wavelength range. Although an equal number of groups containing equal numbers of respective pixels 310 are depicted in the figure, other configurations are possible. As can be appreciated by one of skill in the art after consideration of the present disclosure, the shared event detection and image sensing pixels 501 can be selectively operated in event detection or image sensing modes. Moreover, in accordance with at least some embodiments of the present disclosure, event detection and image sensing operations can be performed simultaneously.

Figure 5E:
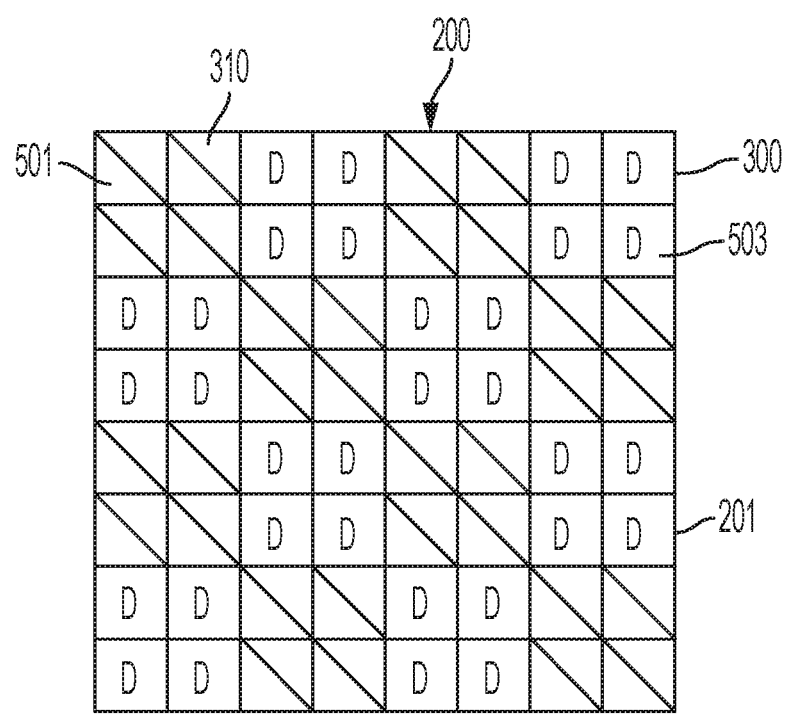
FIG. 5E illustrates aspects of an image sensor in accordance with other embodiments of the present disclosure.

FIG. 5E depicts an image sensor 200 having an array of unit pixels 310 that includes groups of shared event detection and image sensing pixels 501, and groups of event detection pixels 503, formed on the same light receiving chip or substrate 201. The individual groups of shared event detection and image sensing pixels can be configured as Bayer arrays that alternate with groups of event detection pixels 503. Although an equal number of groups containing equal numbers of respective pixels 310 are depicted in the figure, other configurations are possible. As can be appreciated by one of skill in the art after consideration of the present disclosure, the shared event detection and image sensing pixels 501 can be selectively operated in event detection or image sensing modes. Moreover, in accordance with at least some embodiments of the present disclosure, event detection and image sensing operations can be performed simultaneously.

Figure 5F:
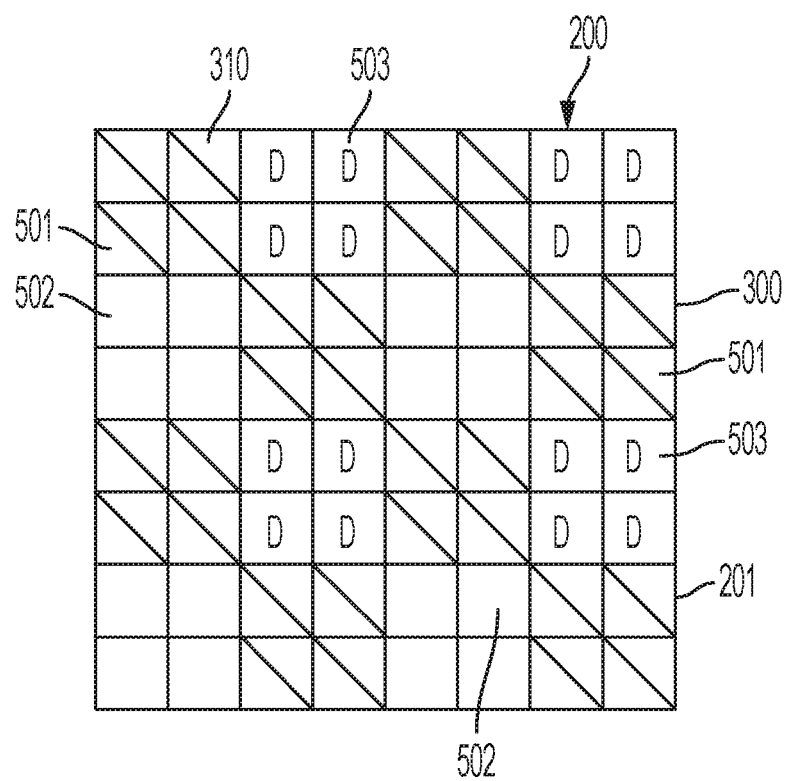
FIG. 5F illustrates aspects of an image sensor in accordance with other embodiments of the present disclosure.

FIG. 5F depicts an image sensor 200 having an array of unit pixels 310 that includes groups of shared event detection and image sensing pixels 501, groups of image sensing pixels 502, and groups of event detection pixels 503, all formed on the same light receiving chip or substrate 201. Some or all of the individual groups of pixels can be configured as Bayer arrays. For instance, in at least one example configuration, groups of shared event detection and image sensing pixels 501 and groups of image sensing pixels can be configured as Bayer arrays, while each of the event detection pixels 503 can be configured to receive light from within the same wavelength range. For example, the shared event detection and image sensing pixels 501 and the image sensing pixels can be associated with color filters, and the event detection pixels 503 can be without color filters. Although an arrangement in which ½ of the pixels 310 are shared event detection and image sensing pixels 501, ¼ of the pixels 310 are image sensing pixels 502, and ¼ of the pixels 310 are event detection pixels 503, other configurations are possible. As can be appreciated by one of skill in the art after consideration of the present disclosure, the shared event detection and image sensing pixels 501 can be selectively operated in event detection or image sensing modes. Moreover, in accordance with at least some embodiments of the present disclosure, event detection and image sensing operations can be performed simultaneously.

Figure 6A:
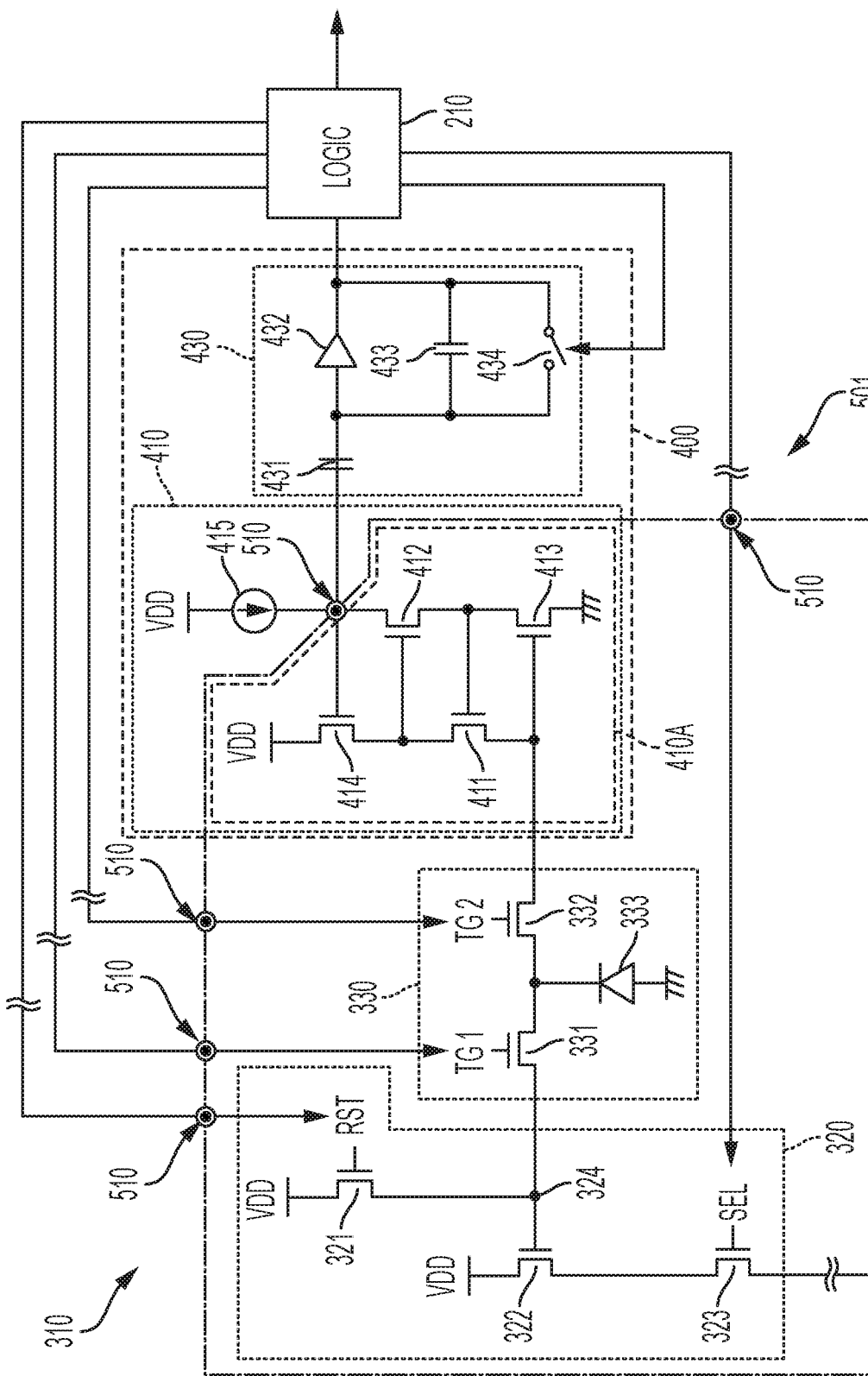
FIG. 6A is a circuit diagram illustrating a schematic configuration example of a unit pixel with combined event detection and image sensor functions in accordance with embodiments of the present disclosure.

Next, a configuration example of a unit pixel 310 will be described. FIG. 6A is a circuit diagram illustrating a schematic configuration example of the unit pixel 310 according to at least some embodiments of the present disclosure, and in particular in accordance with embodiments that include pixels 310 configured as combined or shared event detection (EBS) and image sensor (IS) pixels 501 that perform both event detection and image sensor functions. As illustrated in FIG. 6A, the unit pixel 310 includes, for example, a pixel imaging signal generation unit (or readout circuit) 320, a light-receiving unit 330, and an address event detection unit (or readout circuit) 400. According to at least one example embodiment, the event detection readout circuit 400 can trigger operation of the image signal generation readout circuit 320 based on charge generated by a photoelectric conversion element (or photoelectric conversion region) 333 and based on operation of the logic circuit 210. The logic circuit 210 in FIG. 6A is a logic circuit including, for example, the drive circuit 211, the signal processor 212, and the arbiter 213 in FIG. 3. In accordance with at least some embodiments of the present disclosure, the logic circuit can be implemented in the processor system 130. As described in greater detail elsewhere herein, the logic circuit 210 can make determinations as to whether to trigger operation of the image signal generation readout circuit 320 or the operation of image signal generation circuits 320 associated with other unit pixels 310 based on the output of the event detection readout circuit 400 or the output of other event detection readout circuits 400.

For example, the light-receiving unit 330 includes a first or imaging transmission transistor or gate (first transistor) 331, a second or address event detection transmission transistor or gate (second transistor) 332, and a photoelectric conversion element 333. A first transmission or control signal TG1 transmitted from the drive circuit 211 is selectively supplied to a gate of the first transmission transistor 331 of the light-receiving unit 330, and a second transmission or control signal TG2 transmitted from the drive circuit 211 is selectively supplied to a gate of the second transmission transistor 332. An output through the first transmission transistor 331 of the light-receiving unit 330 is connected to the pixel imaging signal generation unit 320, and an output through the second transmission transistor 332 is connected to the address event detection unit 400.

The pixel imaging signal generation unit 320 can include a reset transistor (third transistor) 321, an amplification transistor (fourth transistor) 322, a selection transistor (fifth transistor) 323, and a floating diffusion layer (FD) 324.

In accordance with at least some embodiments of the present disclosure, the first transmission transistor 331 and the second transmission transistor 332 of the light-receiving unit 330 are constituted, for example, by using an N-type metal-oxide-semiconductor (MOS) transistor (hereinafter, simply referred to as "NMOS transistor"). Similarly, the reset transistor 321, the amplification transistor 322, and the selection transistor 323 of the pixel imaging signal generation unit 320 are each constituted, for example, by using the NMOS transistor.

The address event detection unit 400 can include a current-voltage conversion unit 410 and a subtractor 430. The address event detection unit 400 can further be provided with a buffer, a quantizer, and a transmission unit. Details of the address event detection unit 400 will be described in the following description in connection with FIG. 7.

In the illustrated configuration, the photoelectric conversion element 333 of the light-receiving unit 330 photoelectrically converts incident light to generate a charge. The first transmission transistor 331 transmits a charge generated in the photoelectric conversion element 333 to the floating diffusion layer 324 of the image signal generation readout circuit 320 in accordance with the first control signal TG1. The second transmission transistor 332 supplies an electric signal (photocurrent) based on the charge generated in the photoelectric conversion element 333 to the address event detection unit 400 in accordance with the second control signal TG2.

When an instruction for image sensing is given by the processor system 130, the drive circuit 211 in the logic circuit 210 outputs the control signal TG1 for setting the first transmission transistor 331 of the light-receiving unit 330 of selected unit pixels 310 in the pixel array 300 to an ON-state. With this arrangement, a photocurrent generated in the photoelectric conversion element 333 of the light-receiving unit 330 is supplied to the pixel imaging signal generation readout circuit 320 through the first transmission transistor 331. More particularly, the floating diffusion layer 324 accumulates charges transmitted from the photoelectric conversion element 333 through the first transmission transistor 331. The reset transistor 321 discharges (initializes) the charges accumulated in the floating diffusion layer 324 in accordance with a reset signal transmitted from the drive circuit 211. The amplification transistor 322 allows a pixel signal of a voltage value corresponding to an amount of charge accumulated in the floating diffusion layer 324 to appear in a vertical signal line VSL. The selection transistor 323 switches a connection between the amplification transistor 322 and the vertical signal line VSL in accordance with a selection signal SEL transmitted from the drive circuit 211. Furthermore, the analog pixel signal that appears in the vertical signal line VSL is read out by the column ADC 220, and is converted into a digital pixel signal.

When an instruction for address event detection initiation is given by the processor system 130, the drive circuit 211 in the logic circuit 210 outputs the control signal for setting the second transmission transistor 332 of the light-receiving unit 330 in the pixel array unit 300 to an ON-state. With this arrangement, a photocurrent generated in the photoelectric conversion element 333 of the light-receiving unit 330 is supplied to the address event detection unit 400 of each unit pixel 310 through the second transmission transistor 332.

When detecting address event ignition on the basis of the photocurrent from the light-receiving unit 330, the address event detection unit 400 of each unit pixel 310 outputs a request to the arbiter 213. With respect to this, the arbiter 213 arbitrates the request transmitted from each of the unit pixels 310, and transmits a predetermined response to the unit pixel 310 that issues the request on the basis of the arbitration result. The unit pixel 310 that receives the response supplies a detection signal indicating the existence or nonexistence of the address event ignition (hereinafter, referred to as "address event detection signal") to the drive circuit 211 and the signal processor 212 in the logic circuit 210.

The drive circuit 211 can also set the second transmission transistor 332 in the unit pixel 310 that is a supply source of the address event detection signal to an OFF-state. With this arrangement, a supply of the photocurrent from the light-receiving unit 330 to the address event detection unit 400 in the unit pixel 310 is stopped.

Next, the drive circuit 211 sets the first transmission transistor 331 in the light-receiving unit 330 of the unit pixel 310 to an ON-state by the transmission signal TG1. With this arrangement, a charge generated in the photoelectric conversion element 333 of the light-receiving unit 330 is transmitted to the floating diffusion layer 324 through the first transmission transistor 331. In addition, a pixel signal of a voltage value corresponding to a charge amount of charges accumulated in the floating diffusion layer 324 appears in the vertical signal line VSL that is connected to the selection transistor 323 of the pixel imaging signal generation unit 320.

As described above, in the image sensor 200, a pixel signal SIG is output from the unit pixel 310 in which the address event ignition is detected to the column ADC 220. In accordance with further embodiments of the present disclosure, a pixel signal is output from the unit pixels 310 within a group or sub array of unit pixels 310 associated with the address of the unit pixel 310 from which an address event detection signal has been provided.

Furthermore, for example, the light-receiving unit 330, the pixel imaging signal generation unit 320, and two log (LG) transistors (sixth and seventh transistors) 411 and 414 and two amplification transistors (eighth and ninth transistors) 412 and 413 in the current-voltage conversion unit 410 of the address event detection unit 400 are disposed, for example, in the light-receiving chip 201 illustrated in FIG. 2, and other components can be disposed, for example, in the logic chip 202 that is joined to the light-receiving chip 201 through the Cu—Cu joining. Therefore, in the following description, in the unit pixel 310, configurations which are disposed in the light-receiving chip 201 are referred to as "upper layer circuit".

Figure 6B:
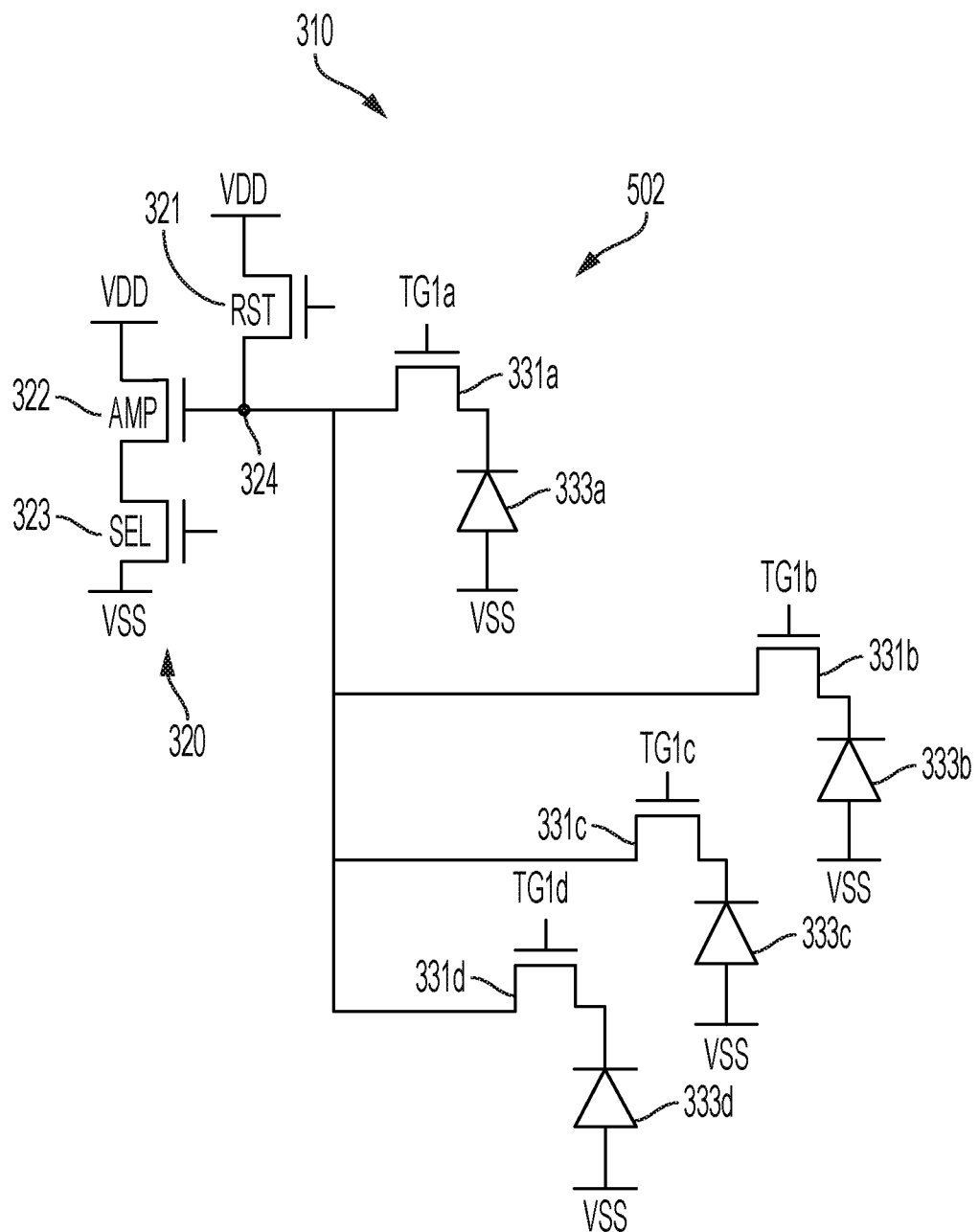
FIG. 6B is a circuit diagram illustrating a schematic configuration example of a group of image sensing pixels in accordance with embodiments of the present disclosure.

A configuration example of a group of unit pixels 310 configured as image sensing pixels 502 with a shared pixel imaging signal generation readout circuitry 320 in accordance with at least some embodiments of the present disclosure is depicted in FIG. 6B. In this example, each photoelectric conversion element 333 is selectively connected to the floating diffusion 324 via a respective transfer gate 331. In addition, the components of the pixel imaging signal readout circuit 320 are shared by the photoelectric conversion units 333. In this example, four photoelectric conversion units 333a-333d, and four corresponding transfer gates 331a-331d, are shown. However, any number of photoelectric conversion units 333 and respective transfer gates 331 can be included in connection with a shared pixel imaging signal readout circuit 320.

Figure 6C:
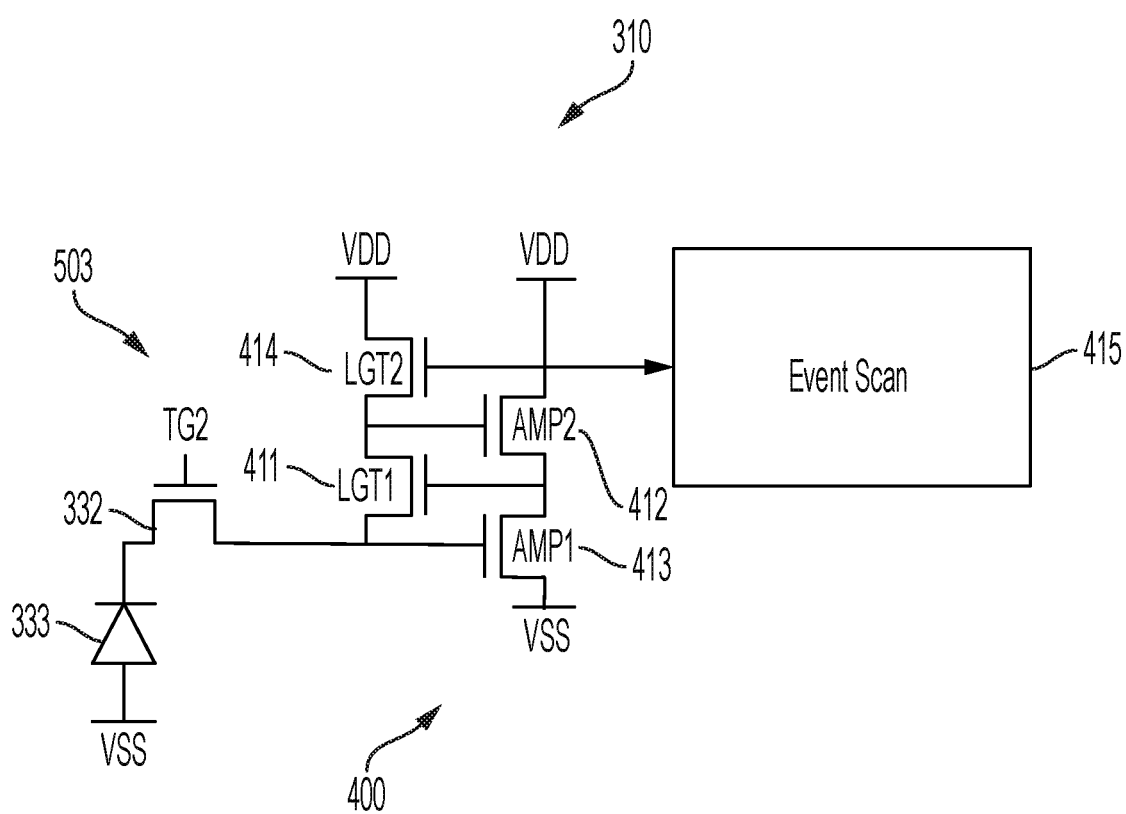
FIG. 6C is a circuit diagram illustrating a schematic configuration example of an event detection pixel in accordance with embodiments of the present disclosure.

A configuration example of a unit pixel 310 configured as a single function address event detection pixel 503 and associated address event detection readout circuit 400 elements is depicted in FIG. 6C. As shown, this example includes a single photoelectric conversion element 333 selectively connected by a transfer gate 332 to components of an address event detection readout circuit 400. An event scan control block 415 controls operation of the address event detection readout circuit 400.

Figure 7:
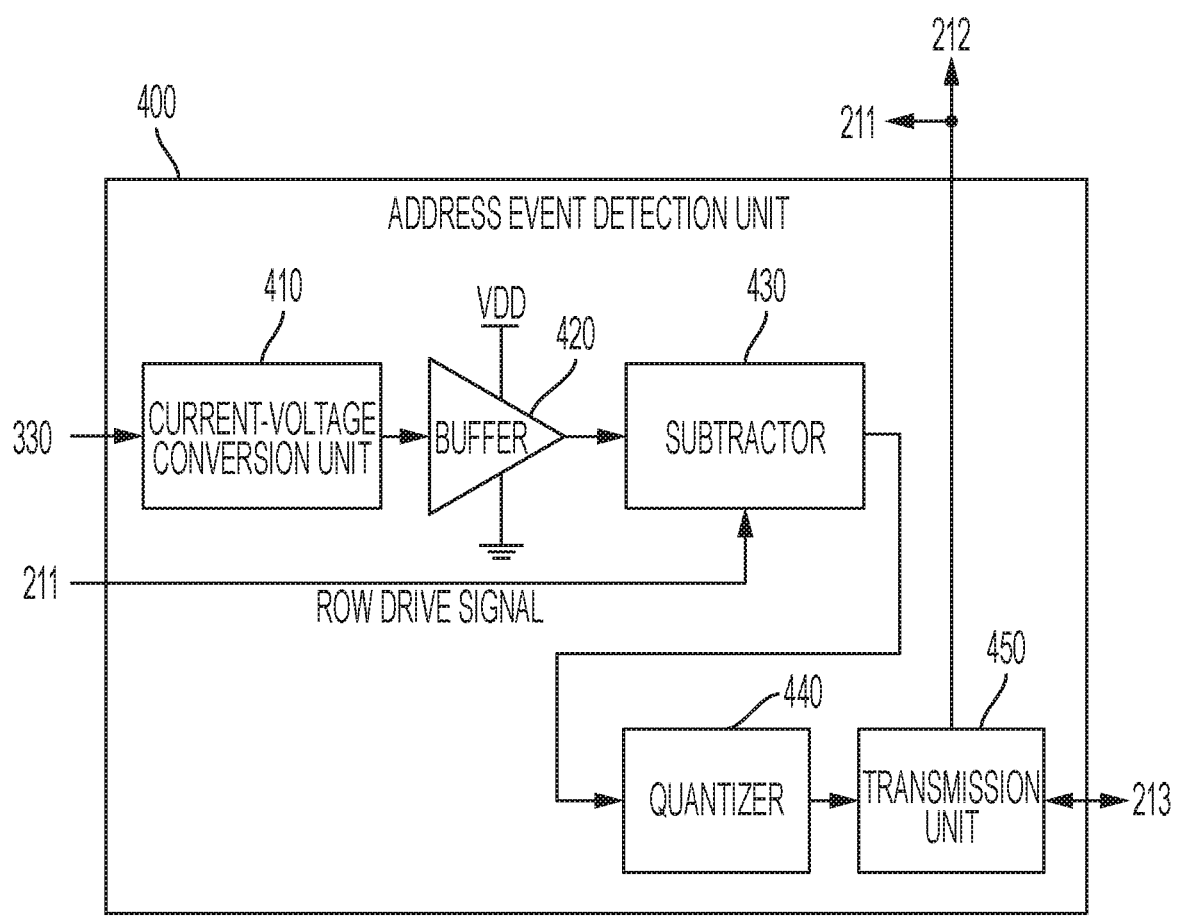
FIG. 7 is a block diagram illustrating a schematic configuration example of an address event detection unit in accordance with embodiments of the present disclosure.

FIG. 7 is a block diagram illustrating a schematic configuration example of the address event detection unit 400 according to at least some embodiments of the present disclosure. As illustrated in FIG. 7, the address event detection unit 400 includes a current-voltage conversion unit 410, a buffer 420, a subtractor 430, a quantizer 440, and a transmission unit 450. The current-voltage conversion unit 410 converts the photocurrent from the light-receiving unit 330 into a voltage signal, and supplies the voltage signal generated through the conversion to the buffer 420. The buffer 420 corrects the voltage signal transmitted from the current-voltage conversion unit 410, and outputs a voltage signal after correction to the subtractor 430. The subtractor 430 lowers a voltage level of the voltage signal transmitted from the buffer 420 in accordance with a row drive signal transmitted from the drive circuit 211 and, supplies the lowered voltage signal to the quantizer 440. The quantizer 440 quantizes the voltage signal transmitted from the subtractor 430 into a digital signal, and outputs the digital signal generated through the quantization to the transmission unit 450 as a detection signal. The transmission unit 450 transmits the detection signal transmitted from the quantizer 440 to the signal processor 212 and the like. For example, when address event ignition is detected, the transmission unit 450 supplies a request for transmission of an address event detection signal from the transmission unit 450 to the drive circuit 211 and the signal processor 212 to the arbiter 213. In addition, when receiving a response with respect to the request from the arbiter 213, the transmission unit 450 supplies the detection signal to the drive circuit 211 and the signal processor 212.

The current-voltage conversion unit 410 in the configuration illustrated in FIG. 7 can include the two LG transistors 411 and 414, the two amplification transistors 412 and 413, and a constant-current circuit 415 as illustrated in FIG. 6A. For example, a source of the LG transistor 411 and a gate of the amplification transistor 413 are connected to a drain of the second transmission transistor 332 of the light-receiving unit 330. In addition, for example, a drain of the LG transistor 411 is connected to a source of the LG transistor 414 and a gate of the amplification transistor 412. For example, a drain of the LG transistor 414 is connected to a power supply terminal VDD. In addition, for example, a source of the amplification transistor 413 is grounded, and a drain thereof is connected to a gate of the LG transistor 411 and a source of the amplification transistor 412. For example, a drain of the amplification transistor 412 is connected to a power supply terminal VDD through the constant-current circuit 415. For example, the constant-current circuit 415 is constituted by a load MOS transistor such as a p-type MOS transistor. In this connection relationship, a loop-shaped source follower circuit is constructed. With this arrangement, a photocurrent from the light-receiving unit 330 is converted into a voltage signal in a logarithmic value corresponding to a charge amount thereof. Furthermore, the LG transistors 411 and 414, and the amplification transistors 412 and 413 may be each constituted, for example, by an NMOS transistor.

Figure 8:
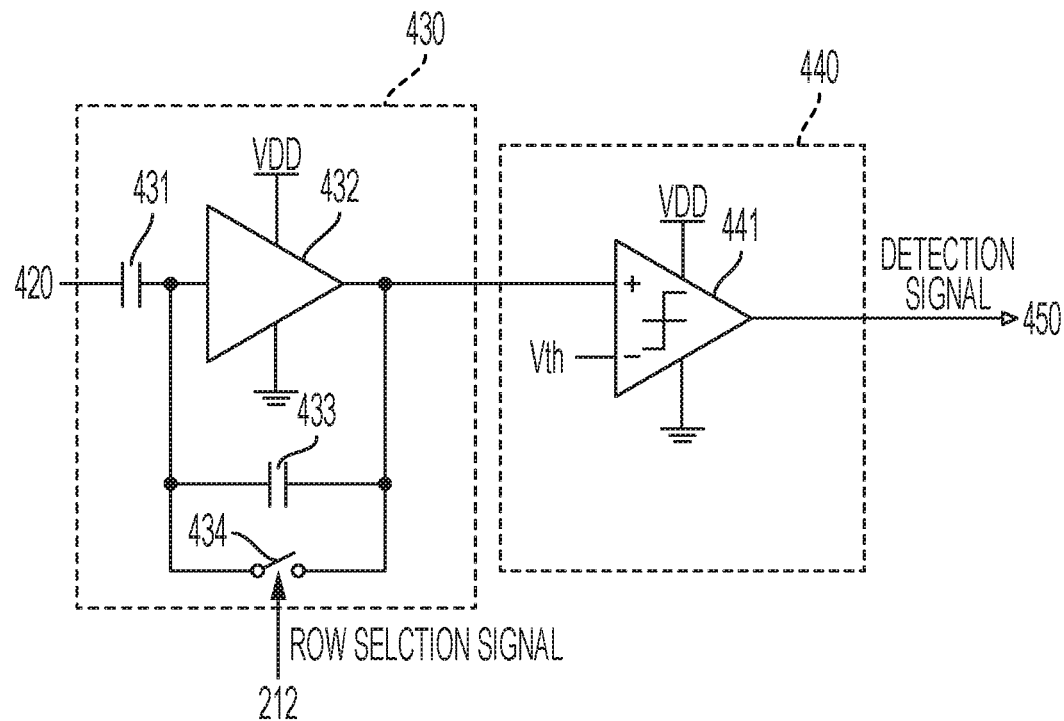
FIG. 8 is a circuit diagram illustrating a schematic configuration example of a subtractor and a quantizer in accordance with embodiments of the present disclosure.

FIG. 8 is a circuit diagram illustrating a schematic configuration example of the subtractor 430 and the quantizer 440 according to at least some embodiments of the present disclosure. As illustrated in FIG. 8, the subtractor 430 includes capacitors 431 and 433, an inverter 432, and a switch 434. In addition, the quantizer 440 includes a comparator 441. One end of the capacitor 431 is connected to an output terminal of the buffer 420, and the other end is connected to an input terminal of the inverter 432. The capacitor 433 is connected to the inverter 432 in parallel. The switch 434 opens or closes a route connecting both ends of the capacitor 433 in accordance with a row drive signal. The inverter 432 inverts a voltage signal that is input through the capacitor 431. The inverter 432 outputs an inverted signal to a non-inverting input terminal (+) of the comparator 441. When the switch 434 is turned on, a voltage signal Vinit is input to a buffer 420 side of the capacitor 431. In addition, the opposite side becomes a virtual ground terminal. A potential of the virtual ground terminal is set to zero for convenience. At this time, when a capacity of the capacitor 431 is set as C1, a potential Qinit that is accumulated in the capacitor 431 is expressed by the following Expression (1). On the other hand, both ends of the capacitor 433 are short-circuited, and thus an accumulated charge thereof becomes zero.

$$Q\text{init} = C1 \times V\text{init} \quad (1)$$

Next, when considering a case where the switch, 434 is turned off, and a voltage of the capacitor 431 on the buffer 420 side varies and reaches Vafter, a charge Qafter accumulated in the capacitor 431 is expressed by the following Expression (2).

$$Q\text{after} = C1 \times V\text{after} \quad (2)$$

On the other hand, when an output voltage is set as Vout, a charge Q2 accumulated in the capacitor 433 is expressed by the following Expression (3).

$$Q2 = -C2 \times V\text{out} \quad (3)$$

At this time, a total charge amount of the capacitors 431 and 433 does not vary, and thus the following Expression (4) is established.

$$Q\text{init} = Q\text{after} + Q2 \quad (4)$$

When Expression (1) to Expression (3) are substituted for Expression (4), the following Expression (5) is obtained.

$$V\text{out} = -(C1/C2) \times (V\text{after} - V\text{init}) \quad (5)$$

Expression (5) represents a subtraction operation of a voltage signal, and a gain of the subtraction result becomes C1/C2. Typically, it is desired to maximize (or alternatively, improve) the gain, and thus it is preferable to make a design so that C1 becomes large and C2 becomes small. On the other hand, when C2 is excessively small, kTC noise increases, and thus there is a concern that noise characteristics deteriorate. Accordingly, a reduction in the capacity of C2 is limited to a range capable of permitting noise. In addition, since the address event detection unit 400 including the subtractor 430 is mounted for every unit pixel 310, a restriction on an area is present in capacities C1 and C2. Values of the capacities C1 and C2 are determined in consideration of the restriction.

The comparator 441 compares a voltage signal transmitted from the subtractor 430 and a predetermined threshold voltage Vth that is applied to an inverting input terminal (−). The comparator 441 outputs a signal indicating the comparison result to the transmission unit 450 as a detection signal. In addition, when a conversion gain by the current-voltage conversion unit 410 is set as $CG_{log}$, and a gain of the buffer 420 is set to "1", a gain A of the entirety of the address event detection unit 400 is expressed by the following Expression (6).

[Mathematical Formula 1]

$$A = \frac{CG_{log} \cdot C1}{C2} \sum_{n=1}^{N} i_{photo\_n} \quad (6)$$

In Expression (6), $i_{photo\_n}$ represents a photocurrent of an nth unit pixel 310, and a unit thereof is, for example, an ampere (A). N represents the number of the unit pixels 310 in a pixel block, and is "1" in this embodiment.

Figure 9:
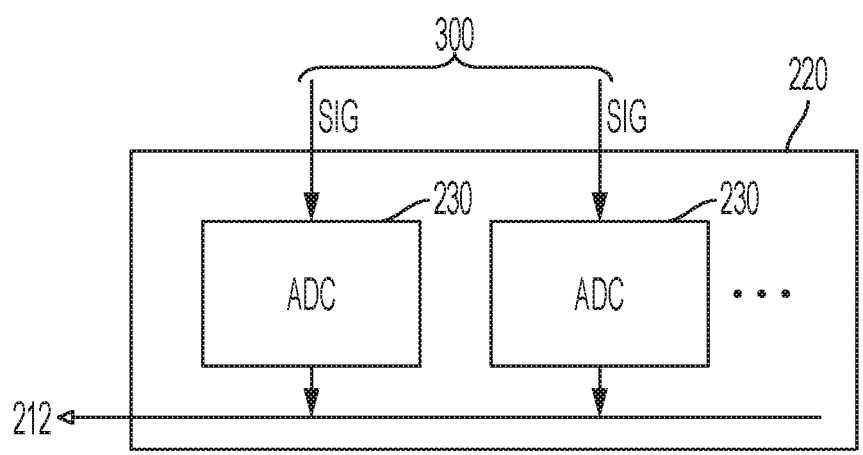
FIG. 9 is a block diagram illustrating a schematic configuration example of a column ADC in accordance with embodiments of the present disclosure.

FIG. 9 is a block diagram illustrating a schematic configuration example of the column ADC according to at least some embodiments of the present disclosure. The column ADC 220 includes a plurality of ADCs 230 which are provided for every column of the unit pixels 310. Each of the ADCs 230 converts an analog pixel signal that appears in the vertical signal line VSL into a digital signal. For example, the pixel signal is converted into a digital signal in which a bit length is greater than that of a detection signal. For example, when the detection signal is set to two bits, the pixel signal is converted into a digital signal of three or greater bits (16 bits and the like). The ADC 230 supplies a generated digital signal to the signal processor 212.

Next, an operation of the image sensor 200 according to at least embodiments of the present disclosure will be described in detail with reference to the accompanying drawings.

Figure 10A:
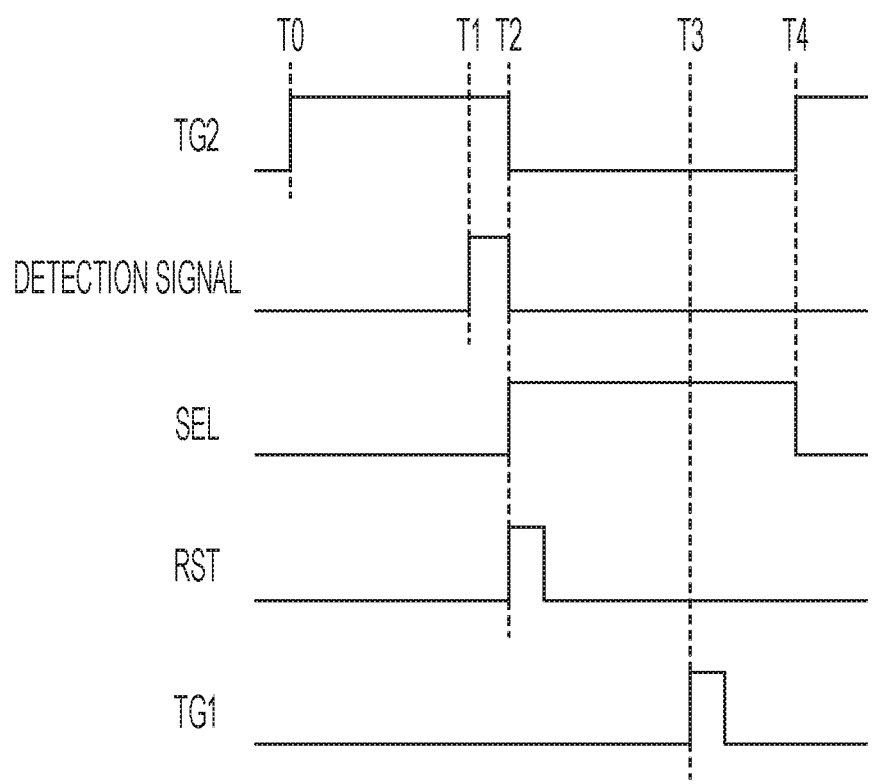
FIG. 10A is a timing chart illustrating an example of an operation of an image sensor in accordance with embodiments of the present disclosure.

First, an example of the operation of the image sensor 200 will be described by using a timing chart. FIG. 10A is a timing chart illustrating an example of the operation of the image sensor according to an embodiment of the present disclosure.

As illustrated in FIG. 10A, at a timing T0, when an instruction for address event detection initiation is given by the processor system 130, the drive circuit 211 raises the control signal TG2 applied to the gate of the second transmission transistor 332 of all of the light-receiving units 330 in the pixel array unit 300 to a high level. With this arrangement, the second transmission transistors 332 of all of the light-receiving units 330 enter an ON-state, and a photocurrent based on a charge generated in the photoelectric conversion element 333 of each of the light-receiving units 330 is supplied from each the light-receiving units 330 to each of a plurality of the address event detection units 400.

In addition, in a period in which the control signal TG2 is at a high level, all of the transmission signals TG1 applied to the gate of the first transmission transistor 331 in each of the light-receiving units 330 are maintained at a low level. Accordingly, in this period, a plurality of the transmission transistors 331 in all of the light-receiving units 330 are in an OFF-state.

Next, a case where the address event detection unit 400 of an arbitrary unit pixel 310 configured to perform event detection detects address event ignition in a period in which the control signal TG2 is in a high level will be assumed. In this case, the address event detection unit 400 that detects the address event ignition transmits a request to the arbiter 213. With respect to this, the arbiter 213 arbitrates the request, and returns a response for the request to the address event detection unit 400 that issues the request.

The address event detection unit 400 that receives the response raises a detection signal that is input to the drive circuit 211 and the signal processor 212 to a high level, for example, in a period of a timing T1 to a timing T2. Furthermore, in this description, it is assumed that the detection signal is a one-bit signal The drive circuit 211 to which a high-level detection signal is input from the address event detection unit 400 at the timing T1 lowers all control signals TG2 to a low level at a subsequent timing T2. With this arrangement, supply of a photocurrent from all of the light-receiving units 330 of the pixel array unit 300 to the address event detection unit 400 is stopped.

In accordance with embodiments of the present disclosure, where a determination by the processor system 130 is made that pixel imaging signal generation circuit 320 should be enabled, at the timing T2, the drive circuit 211 raises a selection signal SEL that is applied to a gate of the selection transistor 323 in the pixel imaging signal generation unit 320 of the unit pixel 310 in which the address event ignition is detected (hereinafter, referred to as "reading-out target unit pixel") to a high level, and raises a reset signal RST that is applied to a gate of the reset transistor 321 of the same pixel imaging signal generation unit 320 to a high level for a constant pulse period, thereby discharging (initializing) charges accumulated in the floating diffusion layer 324 of the pixel imaging signal generation unit 320. In this manner, a voltage, which appears in the vertical signal line VSL in a state in which the floating diffusion layer 324 is initialized, is read out by the ADC 230 connected to the vertical signal line VSL in the column ADC 220 as a reset-level pixel signal (hereinafter, simply referred to as "reset level"), and is converted into a digital signal.

Next, at a timing T3 after reading out the reset level, the drive circuit 211 applies a transmission signal TRG of a constant pulse period to the gate of the first transmission transistor 331 of the light-receiving unit 330 in the reading-out target unit pixel 310. With this arrangement, a charge generated in the photoelectric conversion element 333 of the light-receiving unit 330 is transmitted to the floating diffusion layer 324 in the pixel imaging signal generation unit 320, and a voltage corresponding to charges accumulated in the floating diffusion layer 324 appears in the vertical signal line VSL. In this manner, the voltage that appears in the vertical signal line VSL is read out by the ADC 230 connected to the vertical signal line VSL in the column ADC 220 as a signal-level pixel signal of the light-receiving unit 330 (hereinafter, simply referred to as "signal level") and is converted into a digital value.

The signal processor 212 executes CDS processing in which a difference between the reset level and the signal level which are read out as described above is obtained as a net pixel signal corresponding to a light-reception amount of the photoelectric conversion element 333.

Next, at a timing T4, the drive circuit 211 lowers the selection signal SEL that is applied to the gate of the selection transistor 323 in the pixel imaging signal generation readout circuit 320 of the reading-out target unit pixel 310 to a low level, and raises the control signal TG2 that is applied to the gate of the second transmission transistor 332 of all of the light-receiving units 330 in the pixel array unit 300 to a high level. With this arrangement, address event ignition detection in all of the light-receiving units 330 in the pixel array unit 300 is restarted.

Figure 10B:
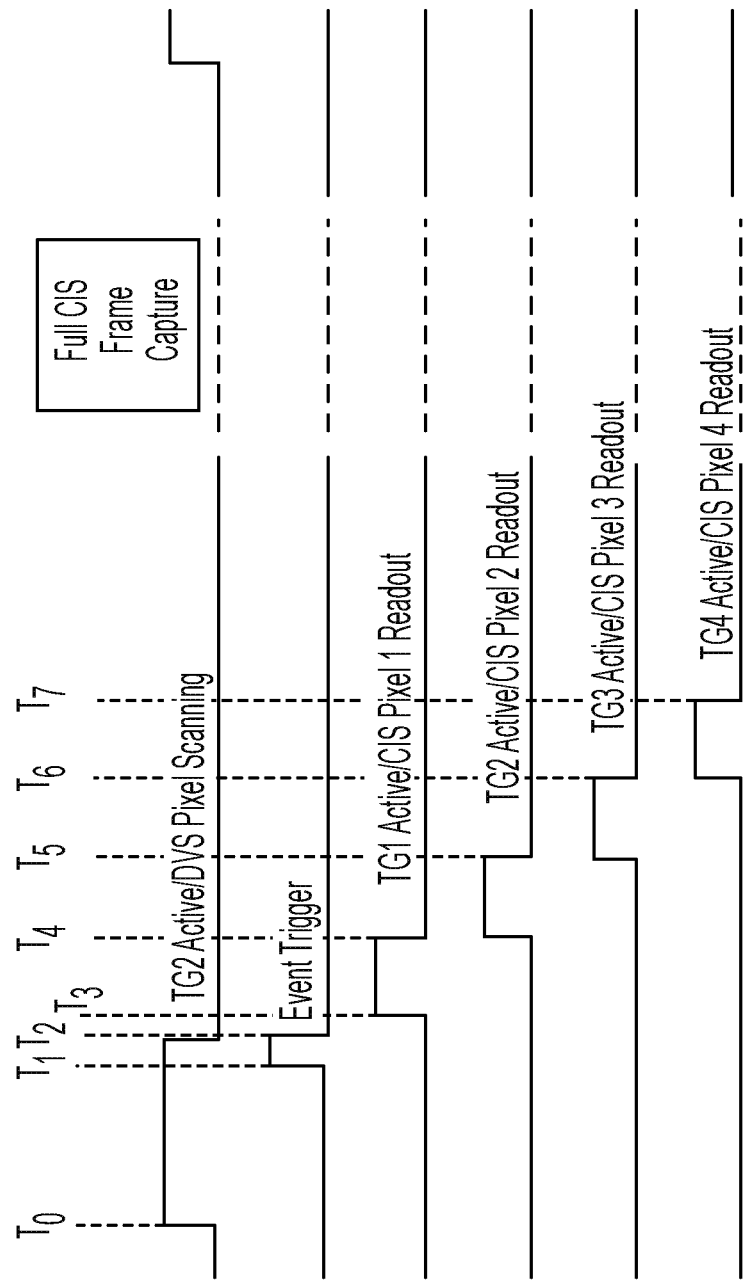
FIG. 10B is a timing chart illustrating an example of an operation of an image sensor in accordance with other embodiments of the present disclosure.

FIG. 10B is a timing chart illustrating an example of an operation of an image sensor in accordance with other embodiments of the present disclosure. At a timing T0, when an instruction for address event detection initiation is given by the processor system 130, the drive circuit 211 raises the control signal TG2 applied to the gate of the transmission transistor 332 associated with photoelectric conversion elements 333 of selectively activated address event detection units 400. More particularly, some or all of the address event detection units 400 may be activated.

In addition, the transmission signal TG1 applied to the gates of the first transmission transistors 331 are maintained in a low level. Accordingly, the associated transmission transistors 331 are in an OFF-state.

In this example, an arbitrary address event detection unit 400 detects address event ignition at a time T1 during which the control signal TG2 is at a high level, and the associated transmission transistor 332 is in an ON-state. In response to the event trigger, image frame capture begins. The image frame capture can be a full frame image capture that involves all of the image sensing pixels 502 included in the pixel array 300. Alternatively, an event detection by a particular event detection unit 400 can operate as a trigger for image capture of by a set of image sensing pixels 502 in a vicinity of the event detection unit 400, or otherwise associated with the event detection unit 400. Readout of signals obtained by the image sensing pixels can then be performed: Moreover, in accordance with embodiments of the present disclosure, the processor system 130 can operate to control areas or regions of the pixel array unit 300 in which image sensing pixels 502 or circuits 320 are enabled and operated to capture image information. In addition, as discussed elsewhere herein, the processor system 130 can operate to control the frame rate of enabled image sensing pixels 502 or circuits 320.

Figure 11:
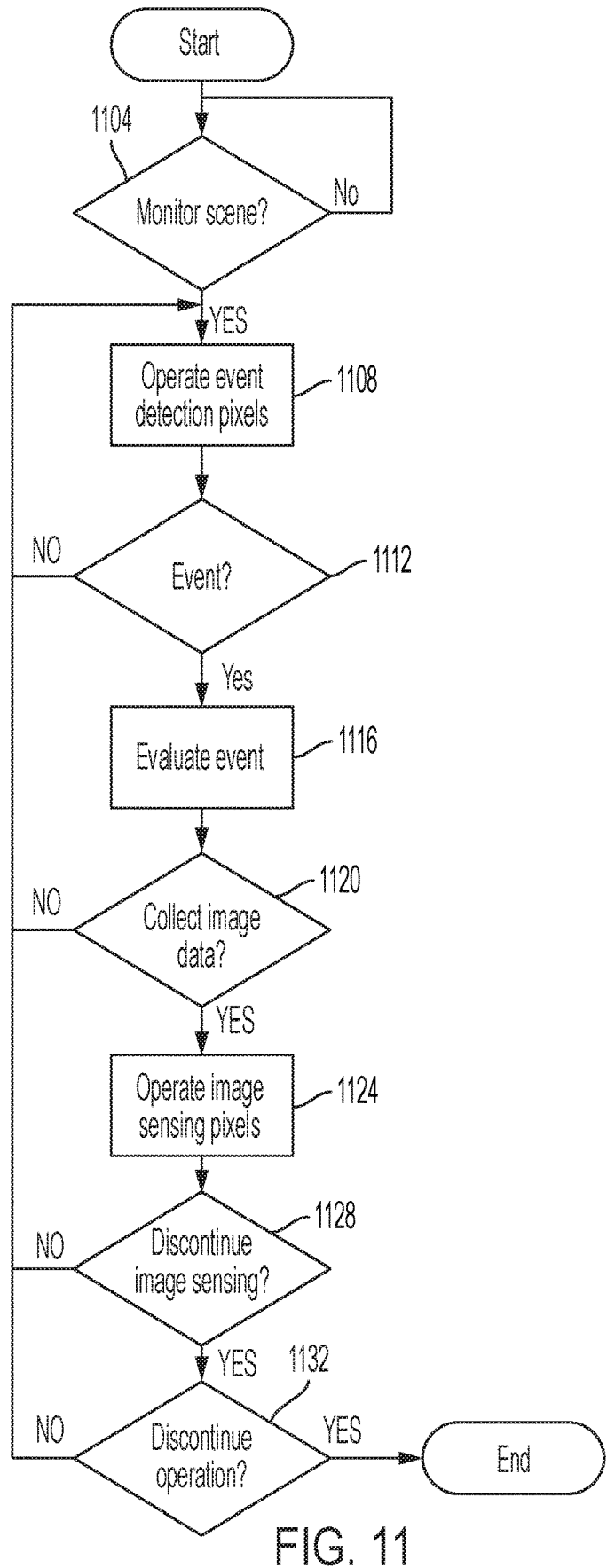
FIG. 11 is a flowchart illustrating an example of the operation of an imaging device in accordance with embodiments of the present disclosure.

FIG. 11 illustrates aspects of the operation of an imaging device 100 in accordance with embodiments of the present disclosure according to at least some embodiments of the present disclosure. Initially, a determination is made as to whether the imaging device 100 should be operated to monitor a scene (step 1104). In at least some operating scenarios, monitoring a scene includes detecting the occurrence of one or more events using event detection capabilities of the imaging system 100, and selectively activating the imaging sensing capabilities of the imaging system 100 in response to the detection of one or more events. If a determination to monitor a scene is not received, the process can idle at step 1104.

After a determination that a scene is to be monitored, the imaging device 100 or components thereof are directed so that the field of view 114 of the imaging lens 110 encompasses the scene or portions of a scene to be monitored, and the shared event detection and image sensing 501 or address event detection 503 pixels of the image sensor 200 are operated to detect the existence or nonexistence of address event ignition (step 1108). As can be appreciated by one of skill in the art after consideration of the present disclosure, the shared event detection and image sensing 501 or address event detection 503 pixels can be operated such that events, in the form of changes in light intensity within the scene are detected asynchronously. Moreover, in accordance with at least some embodiments of the present disclosure, the imaging device 100 is operated to detect events continuously.

Figure 12A:
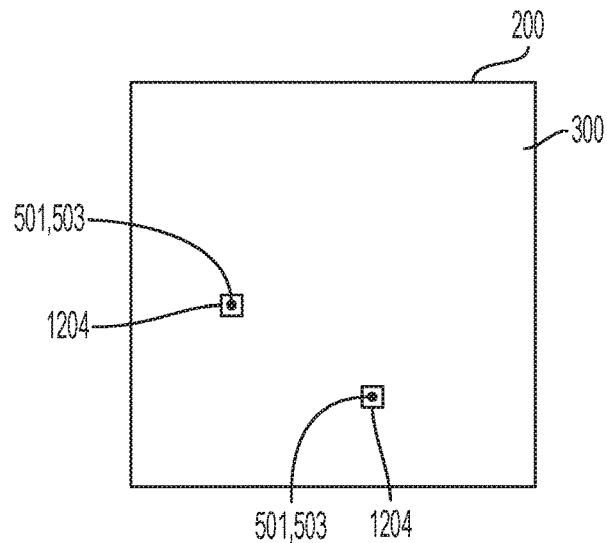
FIG. 12A is a plan view of a portion of a pixel array and depicts aspects of the operation of an imaging system in accordance with embodiments of the present disclosure.

At step 1112, a determination is made as to whether an event has been detected. More particularly, embodiments of the present disclosure can determine whether or not address event ignition has been detected. The detection operation can be performed by the drive circuit 211, and/or through execution of application programming by the processor system 130. As can be appreciated by one of skill in the art after consideration of the present disclosure, and with reference to FIG. 12A, events 1304 are generally indicated by signals output from one or more event detection pixels 501, 503 within the pixel array 300. Moreover, the location of an event 1204 within the pixel array 300 generally corresponds to a location within the scene monitored by the imaging system 100. In accordance with at least some embodiments of the present disclosure, an event can include signals output by one or more event detection pixels 501, 503 within a selected period of time. If no event is detected, the process can return to step 1108, and the shared event detection and image sensing 501 or address event detection 503 pixels of the image sensor 200 continue to be operated to detect the existence of any address event ignition. If an event or set of events is detected, that event or set of events can be evaluated (step 1116).

The evaluation of an event can include registering the time of occurrence of an event and the location of the event within the pixel array 300. As can be appreciated by one of skill in the art after consideration of the present disclosure, the time and location of an event within the pixel array 300 corresponds to an area of the monitored scene from which the change in light intensity resulting in the detection of the event was received. In accordance with further embodiments of the present disclosure, the evaluation of an event that includes multiple event triggers can include determining the number of event triggers received at a particular point in time, or within a selected time frame. Accordingly, the evaluation of an event can include a spatial, temporal, or spatial-temporal analysis. From a spatial analysis, a determination can be made as to whether an event or set of events are present within certain spatial locations within the frame. From a temporal analysis, a determination can be made as to whether an event or set of events are associated with an object moving within the monitored scene over a certain period of time. Moreover, the velocity of the object can be determined. In accordance with still other embodiments of the present disclosure, evaluation of an event can include determining whether multiple events occur in adjacent or nearby event detection pixels 501, 503, or are spaced apart from one another. Accordingly, the evaluation of these an event can further include evaluating an area or region of event detection pixels 501, 503 at a selected time or within a selected time period. In accordance with at least some embodiments of the present disclosure, the signals received from a region of event detection pixels 501, 503 at a selected time or within a selected time period can be evaluated to determine whether received event detection signals correspond to a recognized object. Moreover, a recognized object can be classified. Recognition and classification operations can be performed in connection with the execution of application programming by the processor system 130. In accordance with the least some embodiments of the present disclosure, the application programming executed by the processor system 130 can implement a neural network used to perform object recognition operations based on event detection data.

Figure 12B:
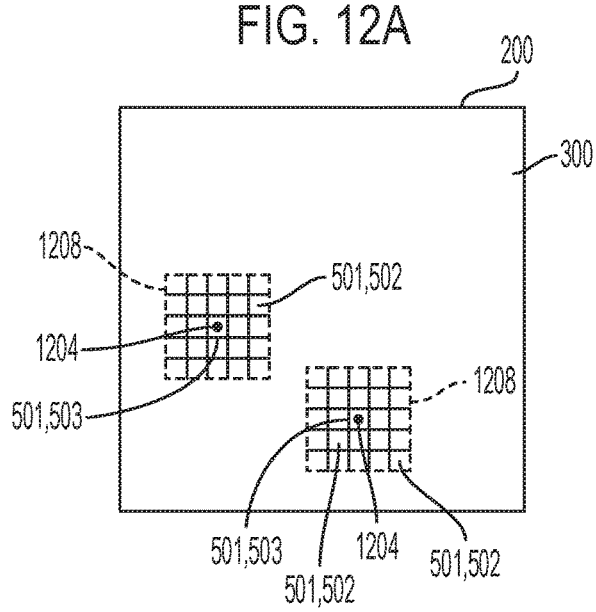
FIG. 12B is a plan view of a portion of a pixel array and depicts other aspects of the operation of an imaging system in accordance with embodiments of the present disclosure.

After the event or set of events has been evaluated, a determination can be made as to whether image data should be collected and, if so, the parameters that should be applied in collecting the image data (step 1120). For example, the imaging system 100 can be operated to collect image data from a region of shared event detection and image sensing 501 or image sensing 502 pixels corresponding to an area or region of the monitored scene in which an event or set of events was detected. For example, a region 1208 of pixels 310 surrounding the location of the pixel 310 at which the event 1204 was detected can be activated. The selected area can include a region 1208 of image sensing pixels 501, 502 that surrounds the location of the event 1204 and that has a predetermined size (see FIG. 12B). In accordance with embodiments of the present disclosure, the processor system 130 can execute application programming that selects the size, contours, or other parameters of the region 1208 surrounding a detected event 1304 in which image sensing pixels 501, 502 are activated.

Figure 12C:
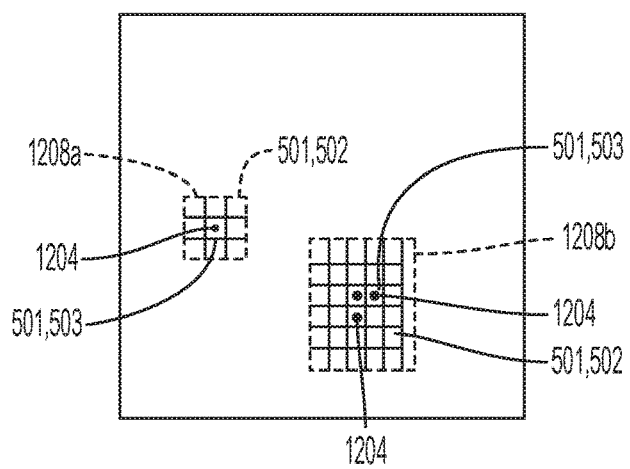
FIG. 12C is a plan view of a portion of a pixel array and depicts other aspects of the operation of an imaging system in accordance with embodiments of the present disclosure.

In accordance with further embodiments of the present disclosure, the area of the region 1208 can be selected based on the characteristics of the detected event or events 1204. For instance, where an event 1204 is detected by multiple adjacent event detection pixels 501, 503, the selected area of the region 1208b in which the multiple adjacent image sensing pixels 501, 502 are activated may be larger than the region 1208a of activated image sensing pixels selected in response to an event detection signal provided by a single event detection pixel 501, 503 (see FIG. 12C). Moreover, the area of the region 1208b in which image sensing pixels 501, 502 are activated may be proportional to the number of adjacent or nearby event detection pixels 501, 503 providing an event detection signal.

Figure 12D:
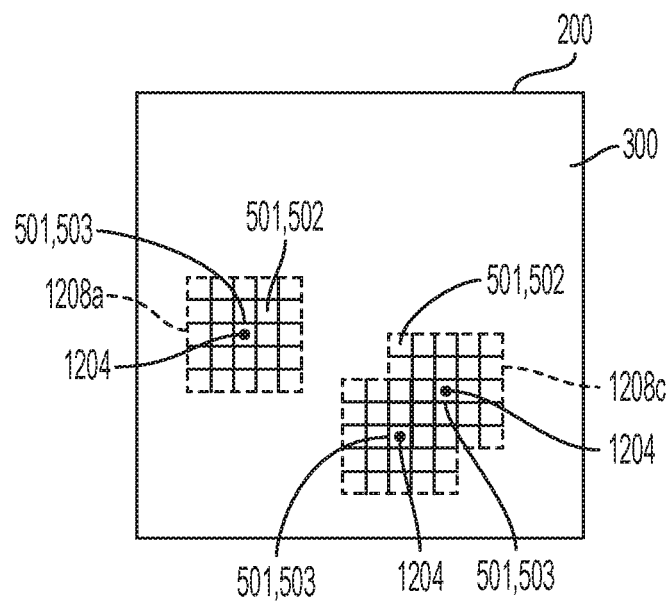
FIG. 12D is a plan view of a portion of a pixel array and depicts other aspects of the operation of an imaging system in accordance with embodiments of the present disclosure.

As depicted in FIG. 12D, a region 1208c in which image sensing pixels 501, 502 are activated can also encompass multiple pixels 310 that are outputting an event detection signal, even where those pixels 310 are not immediately adjacent to one another. In addition, the region 1308c of activated image sensing pixels 501, 503 can have a perimeter that follows the contours of the combined area of the multiple adjacent event detection pixels 501, 503.

Figure 12E:
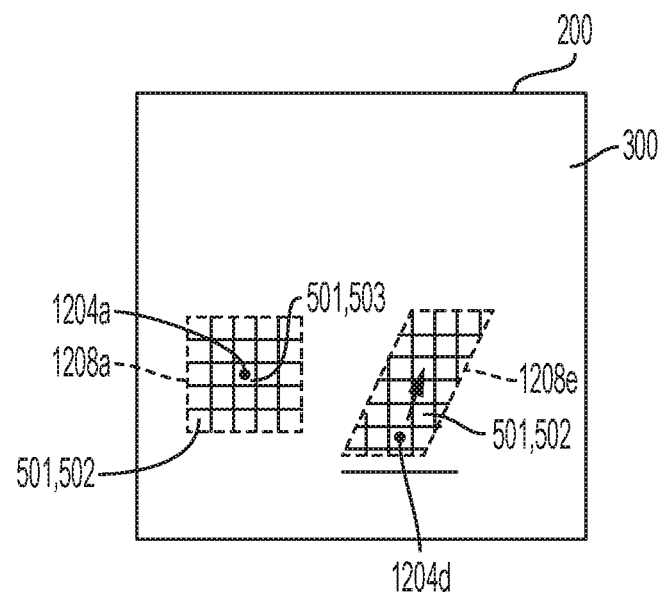
FIG. 12E is a plan view of a portion of a pixel array and depicts other aspects of the operation of an imaging system in accordance with embodiments of the present disclosure.

The area of the region 1208 in which image sensing pixels 501, 502 are activated can also vary based on a determined velocity of an event relative to the pixel array unit 300. In particular, and as previously mentioned, the event detection function of a pixel array unit that includes address event detection 503 or shared address event detection and image sensing pixels 501 can operate asynchronously. Where an event is detected across a sequence of event detection pixels 501, 503 over time, motion may be indicated. Accordingly, a sequence of output signals from a number of different event detection pixels 501, 503 over a contiguous duration of time is an indication that an object associated with the sequence of events is moving. Moreover, the relative location and time of the event detection signals indicates the velocity of the associated object or objects. Accordingly, a larger area or region 1208e of image sensing pixels 501, 502 can be activated where a detected event 1204d associated with an object that is determined to be moving at a high velocity as compared to the area of a region 1208a that is activated around an event associated with an object that is moving at a relatively slow velocity or that is stationary (see FIG. 12E).

In accordance with further embodiments of the present disclosure, the frame rate of the image sensing pixels 501, 502 can be selected based on determined characteristics of the object associated With an event or a group of events. For instance, where a sequence of event detection pixel 502, 503 outputs indicate that an object is moving at a high velocity, a relative high frame rate for the image sensing pixels 502, 503 may be selected. Conversely, if the object associated with a series of event detection pixel 502, 503 outputs is determined to be moving at a relatively low velocity or is determined to be stationary, the selected frame rate for the image sensing pixels 502, 503 may be relatively low. In accordance with at least some embodiments of the present disclosure, the collection of image data from a region 1208 containing a stationary object can be discontinued after the acquisition of a single frame or image data.

In accordance with still further embodiments of the present disclosure, the size of a region, the frame rate of the image sensing pixels 501, 502, or both can be determined based on an analysis of the output of a set of event detection pixels 501, 503. For example, an object recognition process may be performed by the processor system 130. The category, nature, relative velocity, particular object, or other characteristic determined from the output of the event detection pixels 502, 503 attributed to a particular object can then be applied to determine the operating parameter of image sensing pixels 501, 502. For instance, where an object is recognized and determined to be of high interest, a relatively large region of image sensing pixels 501, 502 can be activated to obtain image information encompassing the recognized object. Alternatively or in addition, the frame rate with which selected image sensing pixels 501, 502 are operated can be increased for an object of relatively high interest as compared to an object of relatively low interest.

At step 1124, the image sensing pixels 501, 502 are operated for the selected region or regions 1208 and at a selected frame rate. Accordingly, embodiments of the present disclosure provide and selectively operates regions or subsets of image sensing pixels 501 502 that acquire image information from an area or areas within a scene within which an event has been detected. Image sensing pixels 501, 502 that are not activated can remain in a sleep mode, thereby conserving power. In addition, by operating less than all of the image sensing pixels 501, 502 within a pixel array 300, the transmission and processing bandwidth of the image sensing system 100 can be conserved. Accordingly, a data compression effect can be achieved. In addition, embodiments of the present disclosure can include the selection of a frame rate that is applied during the acquisition of image information. For a fast moving object, the application of a relatively high frame rate can provide improved image resolution or sharpness of the object. Conversely, for a stationary or relatively low moving object, a relatively slow frame rate can provide adequate resolution or sharpness, while saving power as compared to a higher frame rate. In accordance with still other embodiments of the present disclosure, an event or set of events determined to be associated with an object that is of little interest or importance, a small region and/or low frame rate can be applied. In accordance with still other embodiments of the present disclosure, the image sensing pixels covering an area of the scene containing an object of little or no interest can remain in a sleep mode, thereby conserving power, transmission bandwidth, and processing bandwidth.

A determination can then be made as to whether to discontinue image sensing operations (step 1128). In accordance with embodiments of the present disclosure, the acquisition of image information can continue for a predetermined period of time or until a predetermined number of frames of image data from a region 1208 assigned to an object have been acquired. Accordingly, the acquisition of image information related to an object can be discontinued after an initial image or set of images has been acquired. In accordance with still other embodiments of the present disclosure, image information can continue to be acquired for as long as a detected object remains within the field of view 114 of the imaging system 100. The acquisition of image information related to an object can be discontinued after the object is determined to have left the field of view of the imaging device 100. As yet another alternative, the acquisition of image information related to an object can be continued until sufficient image information has been acquired to allow application programming executed by the processor system 130 of the imaging system 104 of an associated system, to perform object recognition and to determine that image acquisition operations associated with that object can be discontinued.

In accordance with embodiments of the present disclosure, event detection functions of the imaging system 100 can remain operational, even while image sensing operations are being performed. Accordingly, embodiments of the present disclosure can dynamically activate or deactivate regions of the image sensing pixels 501, 502 of the imaging system 100.

After a determination that image sensing operations can be discontinued, a determination can next be made as to whether operation of the image sensor system 100 should be discontinued (step 1132). If operation is to continue, the process can return to step 1108. Otherwise, the operation can end.

Figure 13:
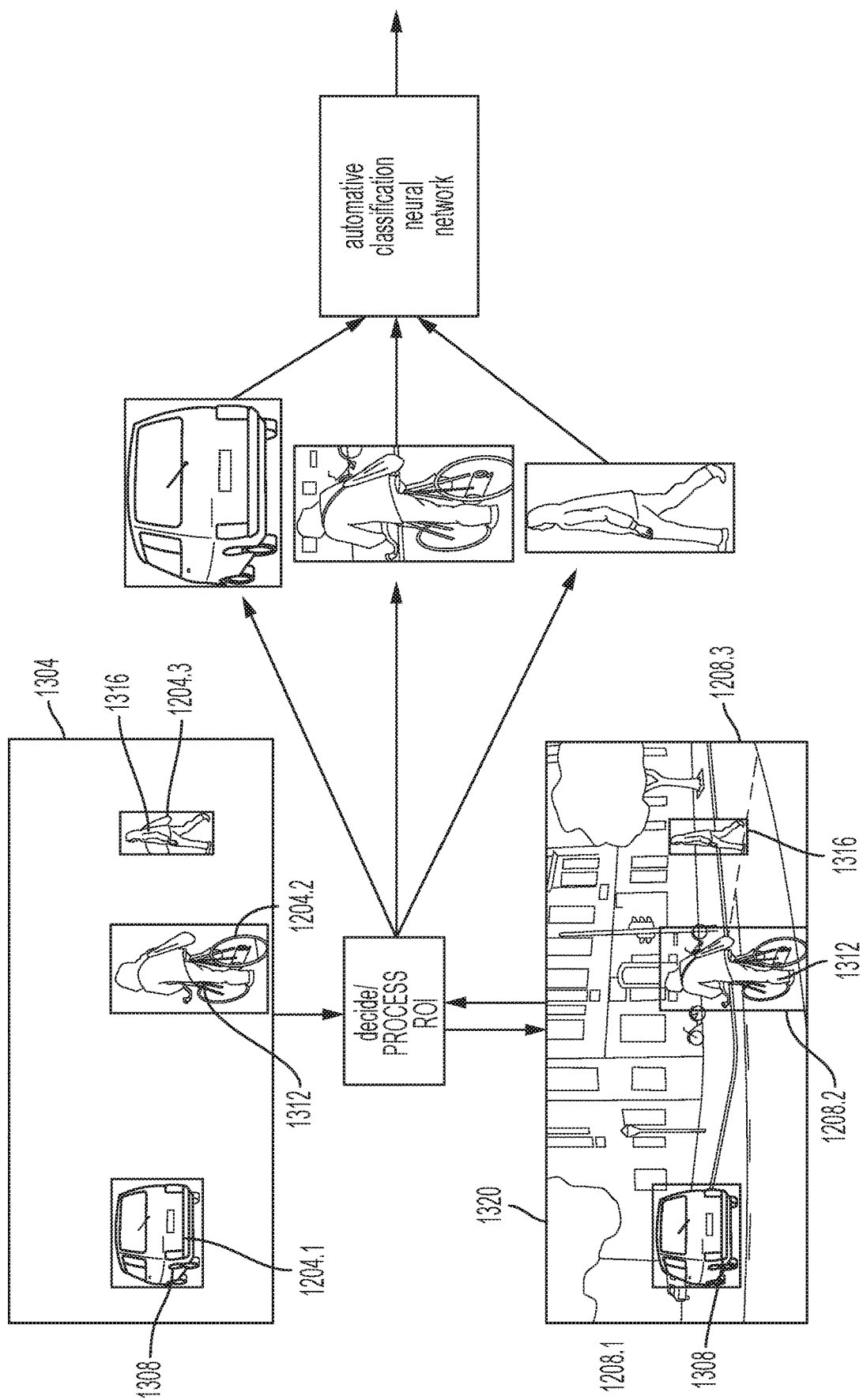
FIG. 13 depicts operations that can be performed by an imaging device in accordance with embodiments of the present disclosure.

FIG. 13 depicts operations that can be performed by an imaging device 100 in accordance with embodiments of the present disclosure. In this example, the imaging device 100 is disposed on a vehicle, and the field of view 114 of the imaging device 100 encompasses a portion of a scene surrounding the vehicle. In block 1304, event detection data acquired by event detection pixels 501, 503 of an image sensor 200 is depicted. The event detection data can include data acquired by the event detection pixels 501, 503 at the same time or from within the same time period. The event detection data is provided to the processor system 130, which identifies regions of interest within that data. For instance, as depicted in the example, there are three distinct groupings of events in the event detection data that each correspond to a different object type: a first event group 1204.1 corresponding to an automobile 1308; a second event group 1204.2 corresponding to a cyclist 1312; and a third event group 1204.3 corresponding to a pedestrian 1316. The processing performed by the processor system 130 can perform recognition functions, which operate to classify the objects from the event detection data, or can simply recognize the groupings of events 1204 as such.

After recognizing the event groups 1204.1 to 1204.3, the processor system 130 determines regions of image sensing pixels 501, 502 to activate. This is illustrated in block 1320, which depicts a full frame of image data acquired from within the same or a similar field of view 114 from which the event detection data shown in block 1304 was acquired, and further shows a first region 1208.1 established for the automobile 1308, a second region 1208.2 established for the cyclist 1312, and a third region 1208:3 established for the pedestrian 1316. As can be appreciated by one of skill in the art after consideration of the present disclosure, the imaging device 100 is typically not operated to obtain full frames of image data. Instead, only those image sensing pixels 501, 502 within the regions 1208 determined by the processor system 130 are activated. Accordingly, embodiments of the present disclosure conserve power by only selectively operating the image sensing pixels 501, 502. In addition, data transmission and processing bandwidth is conserved by only providing image data from image sensing pixels 501, 502 within selected regions 1208, rather from all of the available image sensing pixels 501, 502.

Although not depicted in the figure, the processor system 130 can also use the event detection data to determine a frame rate to apply to selected regions 1208. The determined frame rate for a particular region can be based on the identity of the object as determined from the event detection data, the relative velocity of the object, or a degree of interest in an identified object. For example, a relatively high frame rate could be applied if an automobile 1308 is the object of interest, a moderate frame rate can be applied if a cyclist 1312 is the object of interest, and a relatively low frame rate can be applied if a pedestrian 1316 is the object of interest. A higher frame rate can be applied to an object moving at a faster apparent velocity than an object that is stationary or moving at a lower apparent velocity.

Data from the regions 1208 in which image sensing pixels 501, 502 are activated can be delivered to the processing system 130, which can perform further operations on the collected image data. For example, object recognition based on the image data can be performed in addition to or in place of object recognition based on the event detection data. Alternatively or in addition, operations that are difficult or impossible to perform using the event detection data can be performed. For instance, facial recognition operations can be performed using the image data.

The various operations performed by the processing system 130 on the event detection data and/or the image data can include applying one or more neural networks to analyze the collected information.

Figure 14:
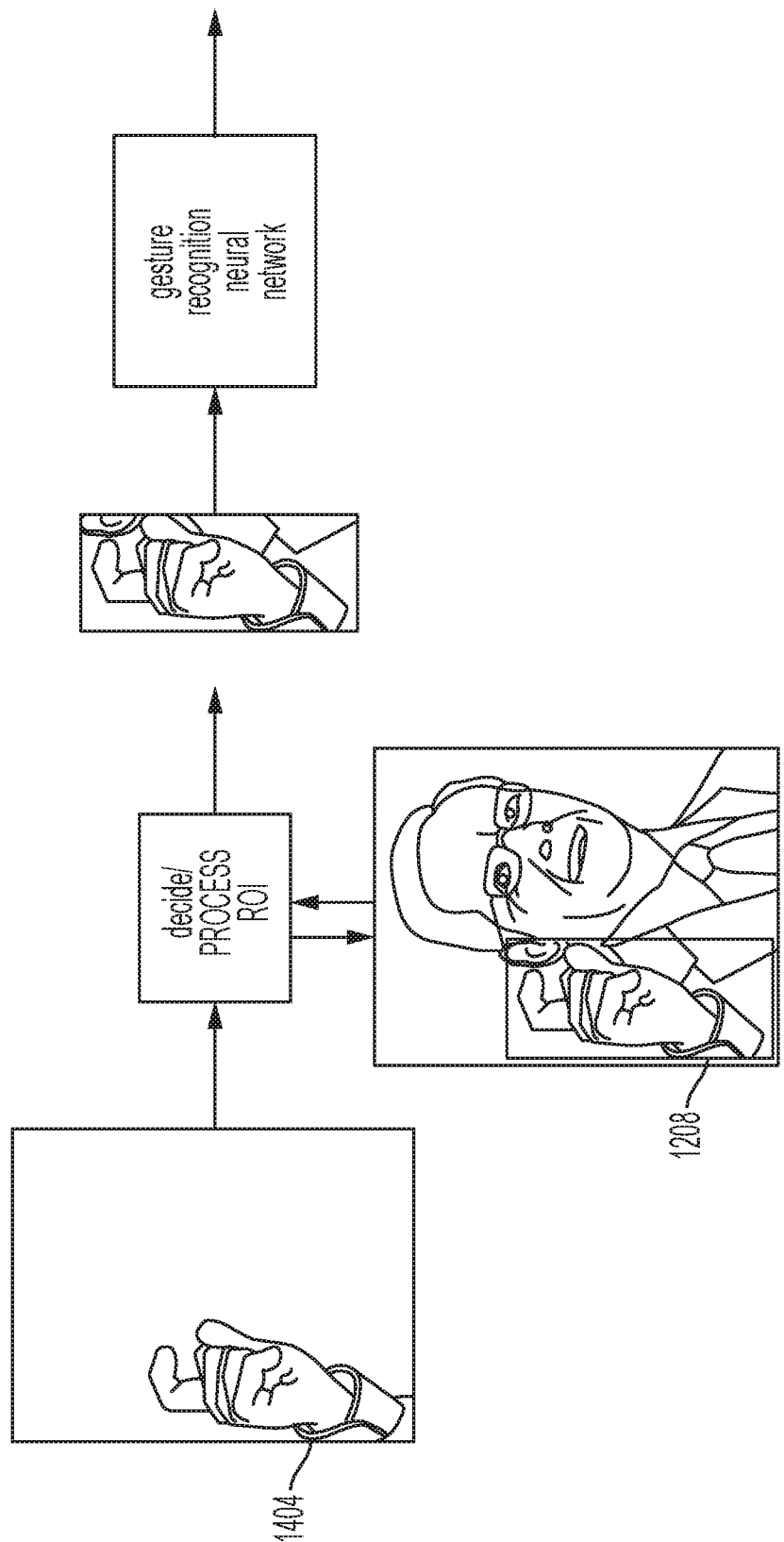
FIG. 14 depicts operations that can be performed by an imaging device in accordance with other embodiments of the present disclosure

FIG. 14 depicts operations that can be performed by an imaging device 100 in accordance with other embodiments of the present disclosure that is configured to perform gesture recognition. In this example, the imaging device 100 is a camera used to capture event detection data 1404 from a scene in which a person is lecturing or speaking. The event detection data 1404 is provided to the processing system 130, which determines a region of image sensing pixels 501, 502 to activate to obtain an image of an object 1408 detected in the event detection data 1404. Here, the object 1408 is the hand of the person, and the region 1208 of image sensing pixels 501, 502 encompasses the hand of the person, but not the face of the person, as shown in the depicted full frame of image data 1412. The image data from the region is then processed, for example by a neural network implemented by the processor system 130 for purposes of gesture recognition. The output from the neural network can be a textual identification of the imaged gesture.

Embodiments of the present disclosure provide imaging devices 100 that are capable of continuously monitoring a selected scene or area of scene using one or more pixel arrays 300 that include a plurality of event detection pixels 501, 503 and a plurality of image sensing pixels 501, 502. In response to the detection of an event by one or more event detection pixels 501, 503, a selected region 1208 of image sensing pixels 501, 502 is activated. One region 1208 may be established around each detected event 1304. The size of any one region 1304 can depend on a preselected size, a number of events 1304 detected within the area at any one time or within a period of time, the velocity of an object associated with a series of events 1304, or the like. Moreover, multiple regions may be established that overlap one another. Alternatively or in addition, a frame rate at which the imaging pixels 501, 502 within a particular region are operated can be determined based on characteristics of the event or events 1304 within the region, or of an object associated with the events 1304. Image sensing pixels 501, 502 not included in any region 1304 can remain in a sleep mode, thereby conserving power.

Embodiments of the present disclosure can continue to operate event detection pixels 502, 503 while image sensing pixels 501, 502 are in operation. As noted elsewhere herein, event detection pixels 502, 503 general operate asynchronously. By continuing to operate the event detection pixels 502, 503, event detection functions can be performed continuously, without loss or diminution of temporal event detection performance of the imaging device 100.

Accordingly, embodiments of the present disclosure provide imaging devices 100 with one or more pixel arrays 300 that are capable of performing both event detection and imaging operations. Moreover, the event detection pixels can be operated continuously, and the image sensing pixels can be operated selectively. The selective operation of the event detection pixels can include the operation of select subsets or groups of event detection pixels in a region or regions encompassing a region or regions in which one or more events have been detected by the event detection pixels. Moreover, a frame rate applied for operation of the image sensing pixels in the one or more regions can be selected based on characteristics of or an identification of the detected event or events. After a selected time period, after an event be imaged is no longer present, or after some other criterion has been met, operation of the image sensing pixels is discontinued, while operation of the event detection pixels continues. Accordingly, continuous monitoring for events is provided in combination with selected imaging operations, thereby providing relevant image data while conserving power, data transmission, and data processing resources.

Figure 15:
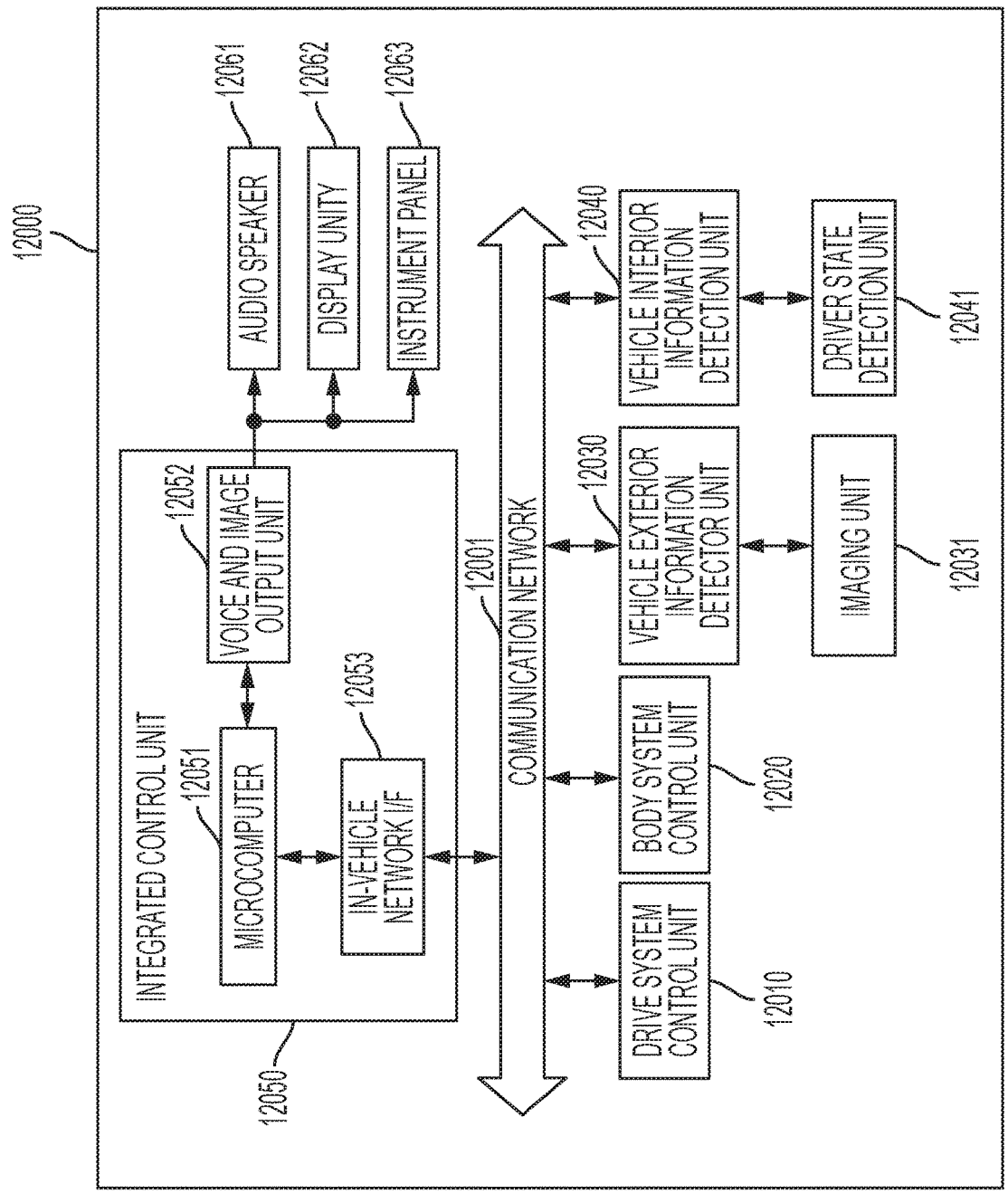
FIG. 15 is a block diagram illustrating an example of a schematic configuration of a vehicle control system.

FIG. 15 is a block diagram illustrating a schematic configuration example of a vehicle control system that is an example of a moving body control system to which the technology according to the present disclosure is applicable.

A vehicle control system 12000 includes a plurality of electronic control units or processor systems that are connected to each other through a communication network 12001. In the example illustrated in FIG. 15, the vehicle control system 12000 includes a drive system control unit 12010, a body system control unit 12020, a vehicle exterior information detection unit 12030, a vehicle interior information detection unit 12040, and an integrated control unit 12050. In addition, as a functional configuration of the integrated control unit 12050, a microcomputer 12051, a voice and image output unit 12052, and an in-vehicle network I/F (interface) 12053 are illustrated in the drawing.

The drive system control unit 12010 controls an operation of a device relating to the drive system of the vehicle in accordance with various programs. For example, the drive system control unit 12010 functions as a control device of a drive force generation device such as an internal combustion engine and a drive motor which generate a drive force of the vehicle, a drive force transmission mechanism that transmits the drive force to wheels, a steering mechanism that adjusts a steering angle of the vehicle, and a braking device that generates a braking force of the vehicle, and the like.

The body system control unit 12020 controls an operation of various devices which are mounted to a vehicle body in accordance with various programs. For example, the body system control unit 12020 functions as a control device of a keyless entry system, a smart key system, a power window device, and various lamps such as a head lamp, a back lamp, a brake lamp, a blinker, and a fog lamp. In this case, an electric wave that is transmitted from a portable device that substitutes for a key, or signals of various switches can be input to the body system control unit 12020. The body system control unit 12020 receives input of the electric wave or the signals, and controls a door lock device, a power window device, a lamp, and the like of the vehicle.

The vehicle exterior information detection unit 12030 detects information regarding an outer side of the vehicle on which the vehicle control system 12000 is mounted. For example, an imaging unit 12031 is connected to the vehicle exterior information detection unit 12030. The vehicle exterior information detection unit 12030 allows the imaging unit 12031 to capture a vehicle exterior image, and receives the captured image. The vehicle exterior information detection unit 12030 may perform object detection processing of a person, a vehicle, an obstacle, a sign, a character on a load, or the like or distance detection processing on the basis of the image that is received.

The imaging unit 12031 is an optical sensor that receives light and outputs an electric signal corresponding to a light-reception amount. The imaging unit 12031 may output the electric signal as an image or as distance measurement information. In addition, light received by the imaging unit 12031 may be visible light, or invisible light such as infrared rays. Moreover, the imaging unit 12031 can include an image sensor 200 incorporating a pixel array unit 300 with the unit pixels 310 configured and isolated from other unit pixels 310 within the pixel array unit 300 in accordance with embodiments of the present disclosure.

The vehicle interior information detection unit 12040 detects vehicle interior information. For example, a driver state detection unit 12041 that detects a driver state is connected to the vehicle interior information detection unit 12040. For example, the driver state detection unit 12041 includes a camera that images a driver, and the vehicle interior information detection unit 12040 may calculate the degree of fatigue or the degree of concentration of a driver on the basis of detection information that is input from the driver state detection unit 12041, or may determine whether or not the driver drowses.

The microcomputer 12051 calculates a control target value of the drive force generation device, the steering mechanism, or the braking device on the basis of vehicle interior or exterior information that is acquired by the vehicle exterior information detection unit 12030 or the vehicle interior information detection unit 12040, and can output a control command to the drive system control unit 12010. For example, the microcomputer 12051 can perform a cooperative control to realize a function of an advanced driver assistance system (ADAS) which includes collision avoidance or impact mitigation of the vehicle, following travel based on an inter-vehicle distance, vehicle speed maintenance travel, vehicle collision alarm, vehicle lane deviation alarm, and the like.

In addition, the microcomputer 12051 can perform a cooperative control for automatic driving and the like in which the vehicle autonomously travels without depending on an operation of a driver by controlling the drive force generation device, the steering mechanism, the braking device, and the like on the basis of information in the vicinity of the vehicle which is acquired by the vehicle exterior information detection unit 12030 or the vehicle interior information detection unit 12040.

The microcomputer 12051 can output a control command to the body system control unit 12020 on the basis of the vehicle exterior information acquired by the vehicle exterior information detection unit 12030. For example, the microcomputer 12051 can perform a cooperative control to realize glare protection such as switching of a high beam into a low beam by controlling the head lamp in correspondence with a position of a preceding vehicle or an oncoming vehicle which is detected by the vehicle exterior information detection unit 12030.

The voice and image output unit 12052 transmits at least one output signal between a voice and an image to an output device capable of visually or aurally notifying a passenger in a vehicle or an outer side of the vehicle of information. In the example in FIG. 15, as the output device, an audio speaker 12061, a display unit 12062, and an instrument panel 12063 are exemplified. For example, the display unit 12062 may include at least one of an on-board display or a head-up display.

Figure 16:
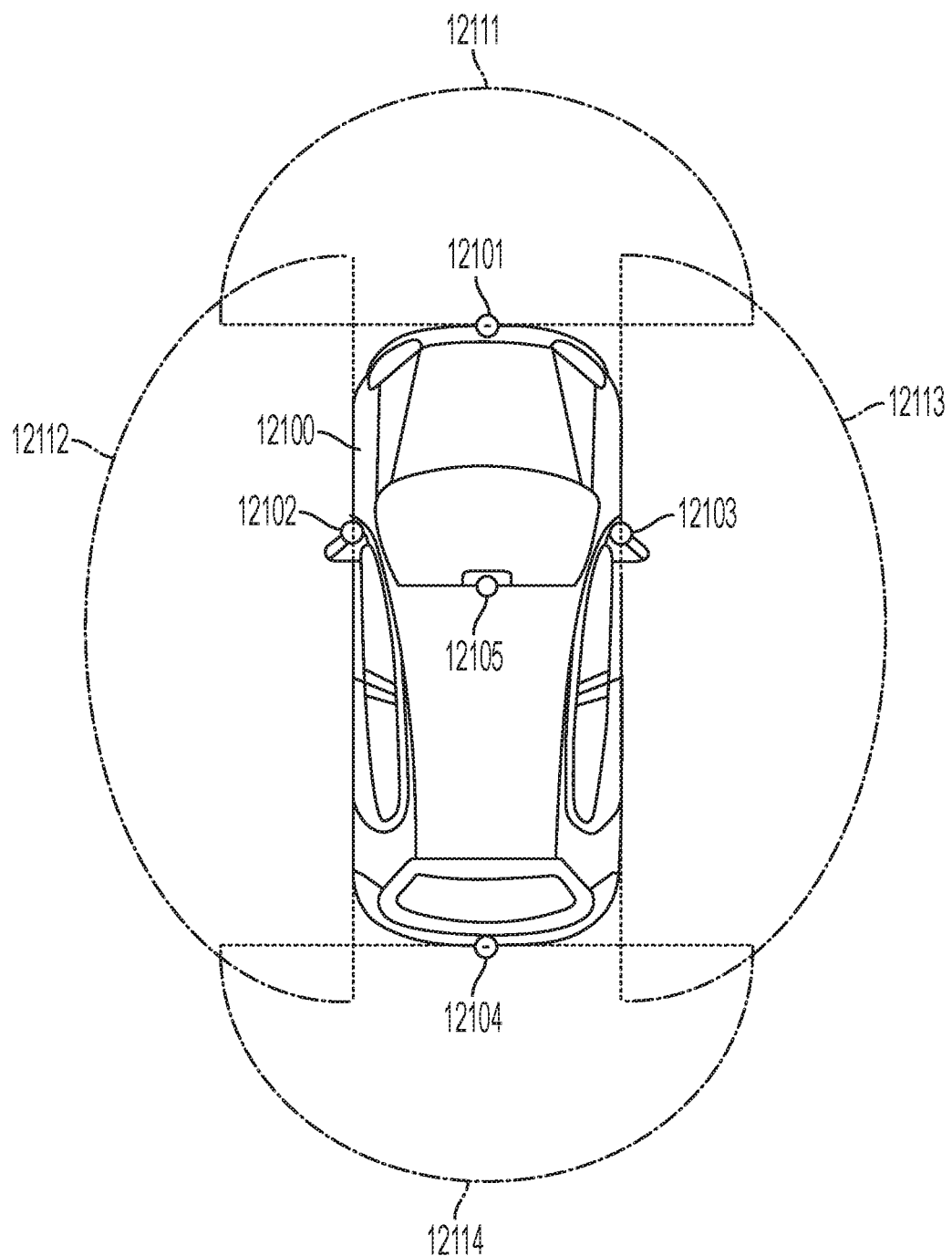
FIG. 16 is a view illustrating an example of an installation position of an out-of-vehicle information detection unit and an imaging unit.

FIG. 16 is a view illustrating an example of an installation position of the imaging unit 12031.

In FIG. 16, as the imaging unit 12031, imaging units 12101, 12102, 12103, 12104, and 12105 are provided.

For example, the imaging units 12101, 12102, 12103, 12104, and 12105 are installed at positions such as a front nose, a side-view mirror, a rear bumper, a back door, and an upper side of a windshield in a vehicle room, of the vehicle 12100. The imaging unit 12101 provided at the front nose, and the imaging unit 12105 that is provided on an upper side of the windshield in a vehicle room mainly acquire images on a forward side of the vehicle 12100. The imaging units 12102 and 12103 which are provided in the side-view mirror mainly acquire images on a lateral side of the vehicle 12100. The imaging unit 12104 that is provided in the rear bumper or the back door mainly acquires images on a backward side of the vehicle 12100. The imaging unit 12105 that is provided on an upper side of the windshield in the vehicle room can be mainly used to detect a preceding vehicle, a pedestrian, an obstacle, a traffic signal, a traffic sign, a vehicle lane, and the like.

Furthermore, FIG. 16 illustrates an example of a photographing range of the imaging units 12101 to 12104. An image capturing range 12111 represents an image capturing range of the imaging unit 12101 that is provided in the front nose, image capturing ranges 12112 and 12113 respectively represent image capturing ranges of the imaging units 12102 and 12103 which are provided in the side-view mirrors, an image capturing range 12114 represents an image capturing range of the imaging unit 12104 that is provided in the rear bumper or the back door. For example, when a plurality of pieces of image data captured by the imaging units 12101 to 12104 are superimposed on each other, it is possible to obtain an overlooking image when the vehicle 12100 is viewed from an upper side.

At least one of the imaging units 12101 to 12104 may have a function of acquiring distance information. For example, at least one of the imaging units 12101 to 12104 may be a stereo camera including a plurality of imaging elements, or may be an imaging element that includes pixels for phase difference detection.

For example, the microcomputer 12051 can extract a three-dimensional object, which is a closest three-dimensional object, particularly, on a proceeding path of the vehicle 12100 and travels in approximately the same direction as that of the vehicle 12100 that travels at a predetermined velocity (for example, 0 km/h or greater), as a preceding vehicle by obtaining distances to respective three-dimensional objects in the image capturing ranges 12111 to 12114 and a variation of the distances with the passage of time (relative velocity to the vehicle 12100) on the basis of the distance information obtained from the imaging units 12101 to 12104. In addition, the microcomputer 12051 can set a distance between vehicles to be secured in advance in front of the preceding vehicle to perform automatic brake control (also including a following stop control), an automatic acceleration control (also including a following acceleration control), and the like. As described above, it is possible to perform a cooperative control for automatic driving in which a vehicle autonomously travels without depending on an operation by a driver, and the like.

For example, the microcomputer 12051 can extract three-dimensional object data relating to a three-dimensional object by classifying a plurality of pieces of the three-dimensional object data into data of a two-wheel vehicle, data of typical vehicle, data of a large-sized vehicle, data of pedestrian, and data of other three-dimensional objects such as an electric pole on the basis of the distance information obtained from the imaging units 12101 to 12104, and can use the three-dimensional object data for automatic obstacle avoidance. For example, the microcomputer 12051 discriminates obstacles at the periphery of the vehicle 12100 into an obstacle that is visually recognized by a driver of the vehicle 12100 and an obstacle that is difficult for the driver to visually recognize. In addition, the microcomputer 12051 determines collision risk indicating the degree of danger of collision with each of the obstacles. In a situation in which the collision risk is equal to or greater than a set value, and collision may occur, the microcomputer 12051 can assist driving for collision avoidance by outputting an alarm to the driver through the audio speaker 12061 or the display unit 12062, or by performing compulsory deceleration or avoidance steering through the drive system control unit 12010.

At least one of the imaging units 12101 to 12104 may be an infrared camera that detects infrared rays. For example, the microcomputer 12051 can recognize a pedestrian by determining whether or not the pedestrian exists in images captured by the imaging units 12101 to 12104. For example, the pedestrian recognition is performed by a procedure of extracting a specific point in the images captured by the imaging units 12101 to 12104 as an infrared camera, and a procedure of performing pattern matching processing for a series of specific points indicating a contour line of an object to determine whether or not the object is a pedestrian. When the microcomputer 12051 determines that a pedestrian exists on the images captured by the imaging units 12101 to 12104, and recognizes the pedestrian, the voice and image output unit 12052 controls the display unit 12062 to overlap and display a quadrangular contour line for emphasis on the pedestrian who is recognized. In addition, the voice and image output unit 12052 may control the display unit 12062 to display an icon indicating the pedestrian or the like at a desired position.

Hereinbefore, description has been given of an example of the vehicle control system to which the technology according to the present disclosure is applicable. The technology according to the present disclosure is applicable to the imaging unit 12031, the driver state detection unit 12041, and the like among the above-described configurations.

Hereinbefore, embodiments of the present disclosure have been described, but the technical range of the present disclosure is not limited to the above-described embodiments, and various modifications can be made in a range not departing from the gist of the present disclosure. In addition, constituent elements in other embodiments and modification examples may be appropriately combined.

In addition, the effects in the embodiments described in this specification are illustrative only, and other effect may exist without a limitation.

Furthermore, the present technology can include the following configurations.

(1) A system, comprising:
   a first pixel group that detects a change in light intensity;
   a second pixel group that detects an amount of light intensity;
   a processor to process output from the first pixel group to, output at least one event signal and determine an operating mode of the second pixel group based on the at least one event signal, wherein the operating mode is one or both of a region of interest and a frame rate of the second pixel group.

(2) The system of (1), wherein the processor is configured to select the frame rate of the second pixel group.

(3) The system of (1) or (2) wherein the processor is configured to select the region of interest.

(4) The system of any of (1) to (3), wherein a pixel in the first pixel group is included in the second pixel group.

(5) The system of (4), wherein the pixel includes a photoelectric conversion region coupled to an imaging circuit that produces the imaging signal and coupled to an event detection circuit that produces the event signal.

(6) The system of any of (1) to (5), wherein the first pixel group includes event detection pixels operating asynchronously.

(7) The system of any of (1) to (6), wherein the first pixel group is operated asynchronously at a same time the second pixel group is operating at a selected frame rate.

(8) The system of (7), wherein less than all of the pixels in the second pixel group are operated at a selected frame rate.

(9) The system of any of (1) to (8), wherein the second pixel group includes a first plurality of pixels that generate signals based on an intensity of red light, a second plurality of pixels that generate signals based on an intensity of green light, and a third plurality of pixels that generate signals based on an intensity of blue light.

(10) An imaging system, comprising:
   a plurality of event based sensor pixels; and
   a plurality of image sensing pixels, wherein at least one of a subset of the image sensing pixels or a frame rate of the image sensing pixels is selected based on a detection event provided by one or more of the event based sensor pixels.

(11) The imaging system of (10), wherein the event based sensor pixels and the image sensing pixels are part of a same sensor device.

(12) The imaging system of (10) or (11), wherein at least some of the event based sensor pixels and at least some of the image sensing pixels share a photoelectric conversion element.

(13) A method for operating an imaging device, comprising:
receiving at least a first event detection signal from at least a first pixel included in a first pixel group;
   in response to receiving the at least a first event detection signal, initiating operation of a first plurality of pixels included in a second pixel group, wherein the operation of a first plurality of pixels in the second pixel group includes less than all of the pixels in the second pixel group; and
   receiving at least a second event detection signal from at least one of the first pixel or a second pixel included in the first pixel group while the first plurality of pixels in the second pixel group is in operation.

(14) The method of (13), wherein the first event detection signal includes a plurality of signals received from a plurality of pixels in the first pixel group, the method further comprising:
   recognizing a first object from the plurality of signals received as part of the first event detection signal; and
   in response to recognizing the first object, determining pixels included in the second pixel group for operation, wherein the determined pixels are pixels within a region encompassing a region of the recognized first object.

(15) The method of (14), wherein the recognized first object is a face.

(16) The method of any of (13) to (15), wherein the operation of the first plurality of pixels in the first pixel group that are operated are in a first region of an array of the pixels included in the first pixel group, the method further comprising:
receiving a second event detection signal from a plurality of pixels in the first pixel group;

recognizing a second object from the plurality of signals received as part of the second event detection signal; and in response to recognizing the second object, leaving pixels included in the second pixel group in a second region surrounding the second object that are not also in the first region in a sleep mode.

(17) The method of any of (14) to (16), further comprising:

determining that the first object has moved; and in response to determining that the first object has moved, altering the region of pixels included in the second group of pixels that are activated.

(18) The method of any of (13) to (17), further comprising:

discontinuing operation of the plurality of pixels included in the second pixel group; and after discontinuing operation of the plurality of pixels included in the second pixel group, receiving at least a third event detection signal from at least one of the first, the second, or a third pixel included in the first pixel group.

(19) The method of any of (13) to (18), further comprising:

operating the first plurality of pixels at a first frame rate.

What is claimed is:

1. A system, comprising:
a first pixel group that detects a change in light intensity;
a second pixel group that detects an amount of light intensity;
a processor to:
  receive a first event detection signal from at least a first pixel included in the first pixel group;
  in response to receiving the first event detection signal, initiating operation of a first plurality of pixels included in the second pixel group, wherein the operation of the first plurality of pixels in the second pixel group includes fewer than all of the pixels in the second pixel group;
  receive a second event detection signal from at least one of the first pixel or a second pixel included in the first pixel group while the first plurality of pixels in the second pixel group is in operation, wherein the first event detection signal includes a plurality of signals received from a plurality of pixels in the first pixel group;
  perform object recognition to recognize a first object from the plurality of signals received as part of the first event detection signal;
  in response to recognizing the first object, determine pixels included in the second pixel group for operation, wherein the determined pixels are pixels within a region encompassing a region of the recognized first object, wherein the plurality of pixels in the first pixel group are operated in a first region of the first pixel group;
  receive a third event detection signal from the plurality of pixels in the first pixel group;
  recognize a second object from a plurality of signals received as part of the third event detection signal; and
  in response to recognizing the second object, leave pixels included in the second pixel group in a second region surrounding the second object that are not also in the first region in a sleep mode.

2. The system of claim 1, wherein the processor is configured to select a frame rate of the second pixel group.

3. The system of claim 1, wherein a pixel in the first pixel group is included in the second pixel group.

4. The system of claim 3, wherein the pixel includes a photoelectric conversion region coupled to an imaging circuit that produces an imaging signal, and wherein the photoelectric conversion region is coupled to an event detection circuit that produces event detection signals.

5. The system of claim 1, wherein the first pixel group includes event detection pixels operating asynchronously.

6. The system of claim 5, wherein the first pixel group is operated asynchronously at a same time the second pixel group is operating at a selected frame rate.

7. The system of claim 6, wherein fewer than all of the pixels in the second pixel group are operated at the selected frame rate.

8. The system of claim 7, wherein the second pixel group includes pixels that generate signals based on an intensity of red light, pixels that generate signals based on an intensity of green light, and pixels that generate signals based on an intensity of blue light.

9. An imaging system, comprising:
a first pixel group including event based sensor pixels; and
a second pixel group including image sensing pixels; and
a processor that:
  receives a first event detection signal from at least a first event based sensor pixel included in the first pixel group;
  in response to receiving the first event detection signal, initiating operation of a first plurality of the image sensing pixels included in the second pixel group, wherein the operation of the first plurality of the image sensing pixels in the second pixel group includes fewer than all of the image sensing pixels in the second pixel group;
  receive a second event detection signal from at least one of the first event based sensor pixel or a second event based sensor pixel pixel included in the first pixel group while the first plurality of the image sensing pixels in the second pixel group is in operation, wherein the first event detection signal includes a plurality of signals received from a plurality of event based sensor pixels in the first pixel group;
  perform object recognition to recognize a first object from the plurality of signals received as part of the first event detection signal;
  in response to recognizing the first object, determine image sensing pixels included in the second pixel group for operation, wherein the determined image sensing pixels are pixels within a region encompassing a region of the recognized first object, wherein the plurality of event based sensor pixels in the first pixel group are operated in a first region of the first pixel group;
  receive a third event detection signal from the plurality of event based sensor pixels in the first pixel group;
  recognize a second object from a plurality of signals received as part of the third event detection signal; and
  in response to recognizing the second object, leave image sensing pixels included in the second pixel group in a second region surrounding the second object that are not also in the first region in a sleep mode.

10. The imaging system of claim 9, wherein the event based sensor pixels and the image sensing pixels are part of a same sensor device.

11. The imaging system of claim 10, wherein at least some of the event based sensor pixels and at least some of the image sensing pixels share a photoelectric conversion element.

12. A method for operating an imaging device, comprising:
   receiving a first event detection signal from at least a first pixel included in a first pixel group;
   in response to receiving the first event detection signal, initiating operation of a first plurality of pixels included in a second pixel group, wherein the operation of the first plurality of pixels in the second pixel group includes fewer than all of the pixels in the second pixel group; and
   receiving a second event detection signal from at least one of the first pixel or a second pixel included in the first pixel group while the first plurality of pixels in the second pixel group is in operation,
   wherein the first event detection signal includes a plurality of signals received from a plurality of pixels in the first pixel group, and wherein the method further comprises:
      performing object recognition to recognize a first object from the plurality of signals received as part of the first event detection signal; and
      in response to recognizing the first object, determining pixels included in the second pixel group for operation, wherein the determined pixels are pixels within a region encompassing a region of the recognized first object,
   wherein the plurality of pixels in the first pixel group are operated in a first region of the first pixel group, and wherein the method further comprises:
      receiving a third event detection signal from the plurality of pixels in the first pixel group;
      recognizing a second object from a plurality of signals received as part of the third event detection signal; and
      in response to recognizing the second object, leaving pixels included in the second pixel group in a second region surrounding the second object that are not also in the first region in a sleep mode.

13. The method of claim 12, wherein the recognized first object is a face.

14. The method of claim 12, further comprising:
   determining that the first object has moved; and
   in response to determining that the first object has moved, altering a region of pixels included in the second pixel group that are activated.

15. The method of claim 12, further comprising:
   discontinuing operation of the first plurality of pixels included in the second pixel group; and
   after discontinuing operation of the first plurality of pixels included in the second pixel group, receiving at least a fourth event detection signal from at least one of the first, the second, or a third pixel included in the first pixel group.

16. The method of claim 12, further comprising:
   operating the first plurality of pixels included in the second pixel group at a first frame rate.

* * * * *